US012739680B2

(12) United States Patent
Kim

(10) Patent No.: US 12,739,680 B2
(45) Date of Patent: Sep. 15, 2026

(54) ELECTRONIC DEVICE FOR CHANNEL MEASUREMENT AND OPERATING METHOD THEREOF

(71) Applicant: Samsung Electronics Co., Ltd., Suwon-si (KR)

(72) Inventor: Hyeonsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 452 days.

(21) Appl. No.: 18/343,532

(22) Filed: Jun. 28, 2023

(65) Prior Publication Data

US 2024/0049030 A1 Feb. 8, 2024

Related U.S. Application Data

(63) Continuation of application No. PCT/KR2023/008668, filed on Jun. 22, 2023.

(30) Foreign Application Priority Data

Jul. 26, 2022 (KR) ........................ 10-2022-0092434
Sep. 6, 2022 (KR) ........................ 10-2022-0112764

(51) Int. Cl.
*H04W 24/10* (2009.01)
*H04B 17/318* (2015.01)
*H04W 76/27* (2018.01)

(52) U.S. Cl.
CPC .......... *H04W 24/10* (2013.01); *H04B 17/318* (2015.01); *H04W 76/27* (2018.02)

(58) Field of Classification Search
CPC .... H04B 17/318; H04W 24/10; H04W 48/12; H04W 48/16; H04W 76/27
See application file for complete search history.

(56) References Cited

U.S. PATENT DOCUMENTS 8,073,453 B2 12/2011 Funnell
8,942,205 B2 1/2015 Mach et al.
(Continued)

FOREIGN PATENT DOCUMENTS

KR 10-2003-0090519 A 11/2003
KR 10-2020-0112288 10/2020
(Continued)

OTHER PUBLICATIONS

International Search Report (ISR) English translation of PCT/KR2023/008668; mailed Sep. 15, 2023 (Year: 2023).*
(Continued)

*Primary Examiner* — Benjamin H Elliott, IV
(74) *Attorney, Agent, or Firm* — NIXON & VANDERHYE P.C.

(57) ABSTRACT

An embodiment of the disclosure relates to an electronic device for channel measurement in a wireless communication system and an operating method thereof. The electronic device may include: a communication circuit, and a processor, and the processor is configured to: obtain information related to measurement from a message related to release of a radio resource control (RRC) connection of the electronic device to a network, identify frequencies for measurement while the electronic device is in an RRC idle or an RRC inactive state with the network, generate a frequency list including at least one of the frequencies for measurement based on a priority of a frequency used for access between the electronic device and the network and a channel state between the electronic device and the network, sequentially perform measurement based on a priority of at least one frequency included in the frequency list while the electronic device is in an RRC idle state or an RRC inactive state with the network, and control the communication circuit to trans-
(Continued)

mit a result of the measurement to the network based on transition to an RRC connected state.

18 Claims, 8 Drawing Sheets

(56) References Cited

U.S. PATENT DOCUMENTS 11,356,879 B2 6/2022 Kim et al.
2003/0218995 A1* 11/2003 Kim .................. H04W 36/0066 370/318
2005/0181801 A1* 8/2005 Funnell ................. H04W 48/16 455/452.2
2010/0034160 A1* 2/2010 Prakash ................ H04W 68/02 370/329
2013/0142104 A1* 6/2013 Lee ......................... H04W 4/06 370/312
2013/0188499 A1* 7/2013 Mach .................... H04W 48/20 370/252
2015/0365954 A1* 12/2015 Levine ................ H04W 72/563 455/450
2018/0368018 A1* 12/2018 Kim ...................... H04W 72/23
2019/0037425 A1* 1/2019 Hong .................... H04W 72/23
2019/0306739 A1* 10/2019 Kim ...................... H04W 76/27
2019/0349825 A1* 11/2019 Tseng .................... H04W 48/20
2020/0162983 A1 5/2020 Fujishiro et al.
2020/0252823 A1* 8/2020 Kim ...................... H04W 48/16
2020/0260308 A1* 8/2020 Jin ....................... H04B 17/318
2020/0305014 A1* 9/2020 Kim ...................... H04W 24/10
2020/0383038 A1* 12/2020 Sugirtharaj ........... H04W 48/16
2020/0404524 A1* 12/2020 Van Der Velde ..... H04W 24/08
2021/0037403 A1* 2/2021 Kim ...................... H04W 24/10
2021/0235368 A1* 7/2021 Jung ..................... H04W 48/18
2021/0297911 A1 9/2021 Jung et al.
2022/0015025 A1* 1/2022 Agarwal .............. H04B 17/318
2022/0095394 A1* 3/2022 Sha ................... H04W 72/0473
2022/0232437 A1 7/2022 Kim et al.
2022/0232439 A1* 7/2022 Lee ............... H04W 36/008375
2022/0232440 A1* 7/2022 Dalsgaard ......... H04W 36/0058
2022/0264384 A1* 8/2022 Lee ................. H04W 36/00835
2022/0279369 A1* 9/2022 Kim .................... H04L 41/0803
2022/0295327 A1* 9/2022 Kim ...................... H04W 76/30
2022/0377838 A1* 11/2022 Kim ...................... H04W 24/10
2023/0247721 A1* 8/2023 Kim ...................... H04W 76/27 370/329
2024/0049030 A1* 2/2024 Kim ...................... H04W 24/10
2024/0259083 A1* 8/2024 Zhou ........................ H04B 7/10
2024/0340839 A1* 10/2024 Ghimire ................ H04L 5/0048

FOREIGN PATENT DOCUMENTS

KR 10-2021-0093063 A 7/2021
KR 10-2022-0062392 A 5/2022
WO 2019190245 A1 10/2019
WO 2021/066447 4/2021
WO 2021066728 A1 4/2021

OTHER PUBLICATIONS

Search Report and Written Opinion dated Sep. 15, 2023 issued in International Patent Application No. PCT/KR2023/008668.
3GPP TSG-RAN, "Report on [Post115-e][896][SON/MDT] Logged MDT (Nokia)", Meeting Notes, Meeting #116, Nov. 1-12, 2021, 20 pages.
Extended European Search Report for EP Application No. 23846814.4 dated Jul. 28, 2025, 13 pages.

* cited by examiner 200
101
ELECTRONIC DEVICE
192
WIRELESS COMMUNICATION MODULE
FIRST ANTENNA MODULE
242
SECOND ANTENNA MODULE
244
FIRST COMMUNICATION PROCESSOR
212
FIRST RFIC
222
FIRST RFFE
232
SECOND RFIC
224
SECOND RFFE
234
120
PROCESSOR
MEMORY
130
214
SECOND COMMUNICATION PROCESSOR
FOURTH RFIC
228
THIRD ANTENNA MODULE
226
246
248
THIRD RFIC
236
THIRD RFFE
238
PHASE SHIFTER
199
NETWORK
292
FIRST NETWORK
294
SECOND NETWORK

Figure 6:
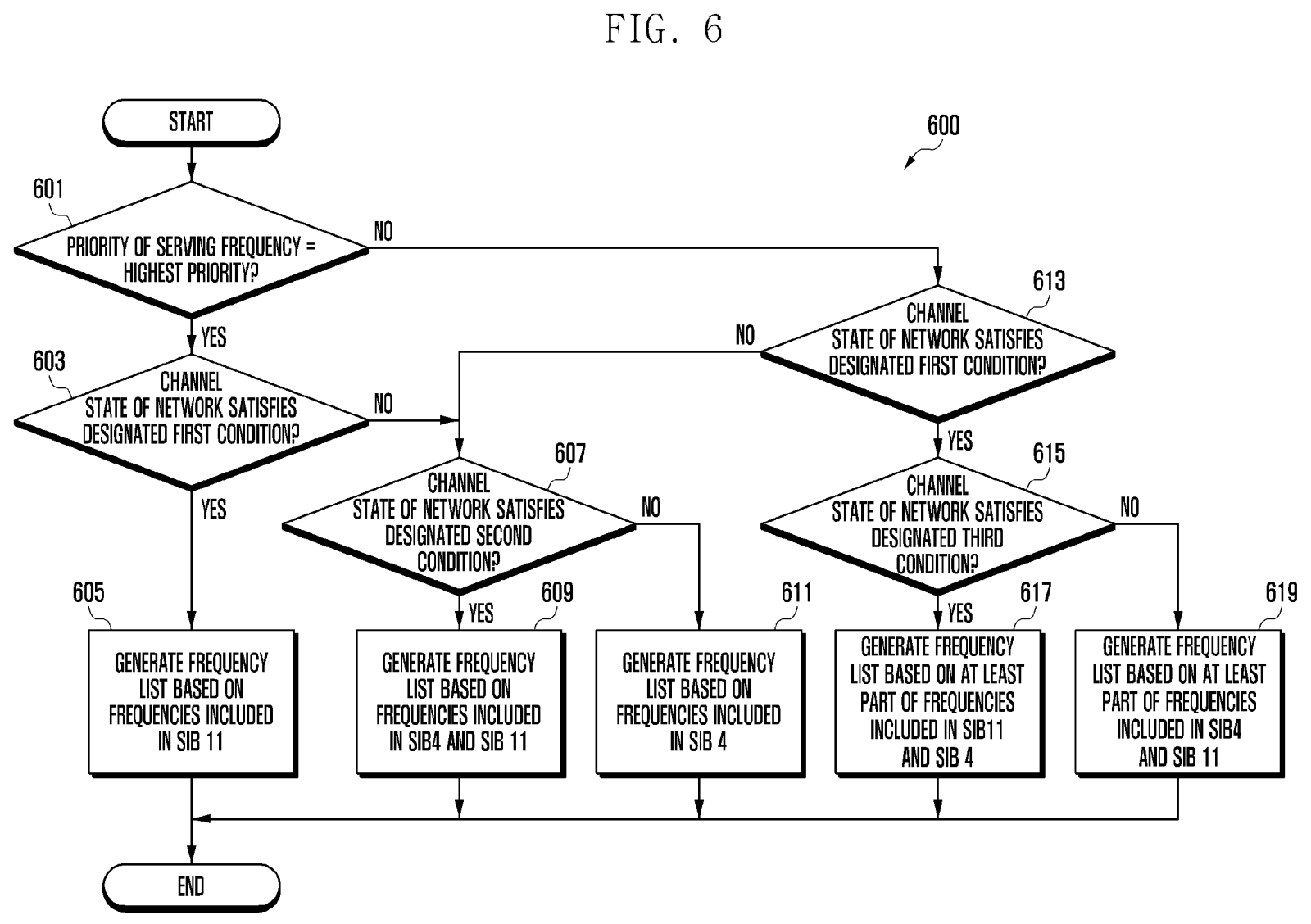

START

601 PRIORITY OF SERVING FREQUENCY = HIGHEST PRIORITY?

YES

NO

603 CHANNEL STATE OF NETWORK SATISFIES DESIGNATED FIRST CONDITION?

YES

NO

605 GENERATE FREQUENCY LIST BASED ON FREQUENCIES INCLUDED IN SIB 11

607 CHANNEL STATE OF NETWORK SATISFIES DESIGNATED SECOND CONDITION?

YES

NO

609 GENERATE FREQUENCY LIST BASED ON FREQUENCIES INCLUDED IN SIB4 AND SIB 11

611 GENERATE FREQUENCY LIST BASED ON FREQUENCIES INCLUDED IN SIB 4

613 CHANNEL STATE OF NETWORK SATISFIES DESIGNATED FIRST CONDITION?

YES

NO

615 CHANNEL STATE OF NETWORK SATISFIES DESIGNATED THIRD CONDITION?

YES

NO

617 GENERATE FREQUENCY LIST BASED ON AT LEAST PART OF FREQUENCIES INCLUDED IN SIB11 AND SIB 4

619 GENERATE FREQUENCY LIST BASED ON AT LEAST PART OF FREQUENCIES INCLUDED IN SIB4 AND SIB 11

END

ELECTRONIC DEVICE FOR CHANNEL MEASUREMENT AND OPERATING METHOD THEREOF

CROSS-REFERENCE TO RELATED APPLICATIONS

This application is a continuation of International Application No. PCT/KR2023/008668 designating the United States, filed on Jun. 22, 2023, in the Korean Intellectual Property Receiving Office and claiming priority to Korean Patent Application Nos. 10-2022-0092434, filed on Jul. 26, 2022, and 10-2022-0112764, filed on Sep. 6, 2022, in the Korean Intellectual Property Office, the disclosures of all of which are incorporated by reference herein in their entireties.

BACKGROUND

Field

The disclosure relates to an electronic device for channel measurement in a wireless communication system and an operating method thereof.

Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in 6 GHz or lower bands (e.g., about 1.8 GHz band or about 3.5 GHz band) or higher frequency bands (e.g., about 28 GHz band or about 39 GHz band) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

A wireless communication system may support at least one of a carrier aggregation (CA) function and a dual connectivity (DC) function in order to support a service for a relatively high data rate and/or a relatively low transmission delay. A base station of a wireless communication system may configure a CA function or a DC function of an electronic device based on a result of measuring a channel (or frequency) received from the electronic device.

The electronic device may relatively quickly perform reporting of a result of channel measurement in order to configure a relative fast configuration of a CA function or a DC function. For example, the electronic device may measure a channel (or frequency) in a radio resource control (RRC) idle state or RRC inactive state. After establishing an RRC connection procedure, the electronic device may transmit (or report) a result of the channel measurement performed in an RRC idle state or RRC inactive state to a network (or base station).

The electronic device may interrupt channel measurement based on transition to an RRC connected state while performing channel measurement in an RRC idle state or RRC inactive state. Based on the interruption of channel measurement, the electronic device may transmit (or report) a result of measurement for some channels (or frequencies) for which channel measurement has been performed to a network (or base station). The network (or base station) may allocate a frequency for a CA function or a DC function based on a channel measurement result received from the electronic device. The electronic device may provide a CA function or a DC function based on a frequency preferred by the electronic device due to interruption of channel measurement.

SUMMARY

Embodiments of the disclosure provide an apparatus and a method for measuring a channel in an RRC idle state or RRC inactive state in an electronic device.

According to an example embodiment, an electronic device may include: a communication circuit and at least one processor operatively connected to the communication circuit. According to an example embodiment, the processor may be configured to obtain information related to measurement from a message related to release of a radio resource control (RRC) connection of the electronic device to a network. According to an example embodiment, the processor may be configured to identify frequencies for measurement while the electronic device is in an RRC idle state (RRC idle) or RRC inactive state (RRC inactive) with a network. According to an example embodiment, the processor may be configured to generate (or update) a frequency list including at least one of frequencies for measurement based on a priority of a frequency used for access between an electronic device and a network and a channel state between the electronic device and the network. According to an example embodiment, the processor may be configured to sequentially perform measurement based on the priority of at least one frequency included in a frequency list while the electronic device is in an RRC idle state or RRC inactive state with a network. According to an example embodiment, the processor may be configured to control the communication circuitry to transmit a result of the measurement to the network based on transition to an RRC connected state.

According to an example embodiment, a method of operating an electronic device may include obtaining information related to measurement from a message related to release of a radio resource control (RRC) connection of the electronic device to a network. According to an example embodiment, the method of operating the electronic device may include identifying frequencies for measurement in a RRC idle state (RRC idle) or RRC inactive state (RRC inactive) with a network. According to an example embodiment, the method of operating the electronic device may include generating a frequency list including at least one of frequencies for measurement based on a priority of a frequency used for access between the electronic device and a network and a channel state between the electronic device and the network. According to an example embodiment, the method of operating the electronic device may include sequentially performing measurement based on a priority of at least one frequency included in the frequency list while the electronic device is in an RRC idle state or RRC inactive state with a network. According to an example embodiment, the method of operating the electronic device may include transmitting a result of the measurement to a network based on transition to an RRC connected state.

According to an example embodiment, a non-transitory computer readable storage medium (or a computer program product) for storing one or more programs may be described. According to an example embodiment, one or more programs may include instructions which, when executed by a processor of an electronic device, cause the electronic device to perform operations including: obtaining information related to measurement from a message related to release of a radio resource control (RRC) connection of the electronic device to a network, identifying frequencies for measurement while the electronic device is in an RRC idle or RRC inactive state with the network, generating a frequency list including at least one of the frequencies for measurement based on a priority of a frequency used for access between the electronic device and the network and a channel state between the electronic device and the network, sequentially performing measurement based on a priority of at least one frequency included in the frequency list while the electronic device is in an RRC idle state or RRC inactive state with the network, and transmitting a result of the measurement to the network based on transition to an RRC connected state.

According to various example embodiments of the disclosure, an electronic device may configure a priority of frequencies for channel measurement in a radio resource control (RRC) idle state or an RRC inactive state based on a priority of a serving frequency and a channel state of a network and perform channel measurement based on the priority, so as to provide a CA function or a DC function based on a frequency preferred by the electronic device.

According to various example embodiments, an electronic device can limit channel measurement for unnecessary frequencies by configuring a frequency list for channel measurement in an RRC idle state or RRC inactive state based on a priority of a serving frequency and a channel state of a network.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a flowchart illustrating example generation of a frequency list for channel measurement in an electronic device according to various embodiments;

DETAILED DESCRIPTION

Hereinafter, various example embodiments will be described in greater detail with reference to the accompanying drawings.

Figure 1:
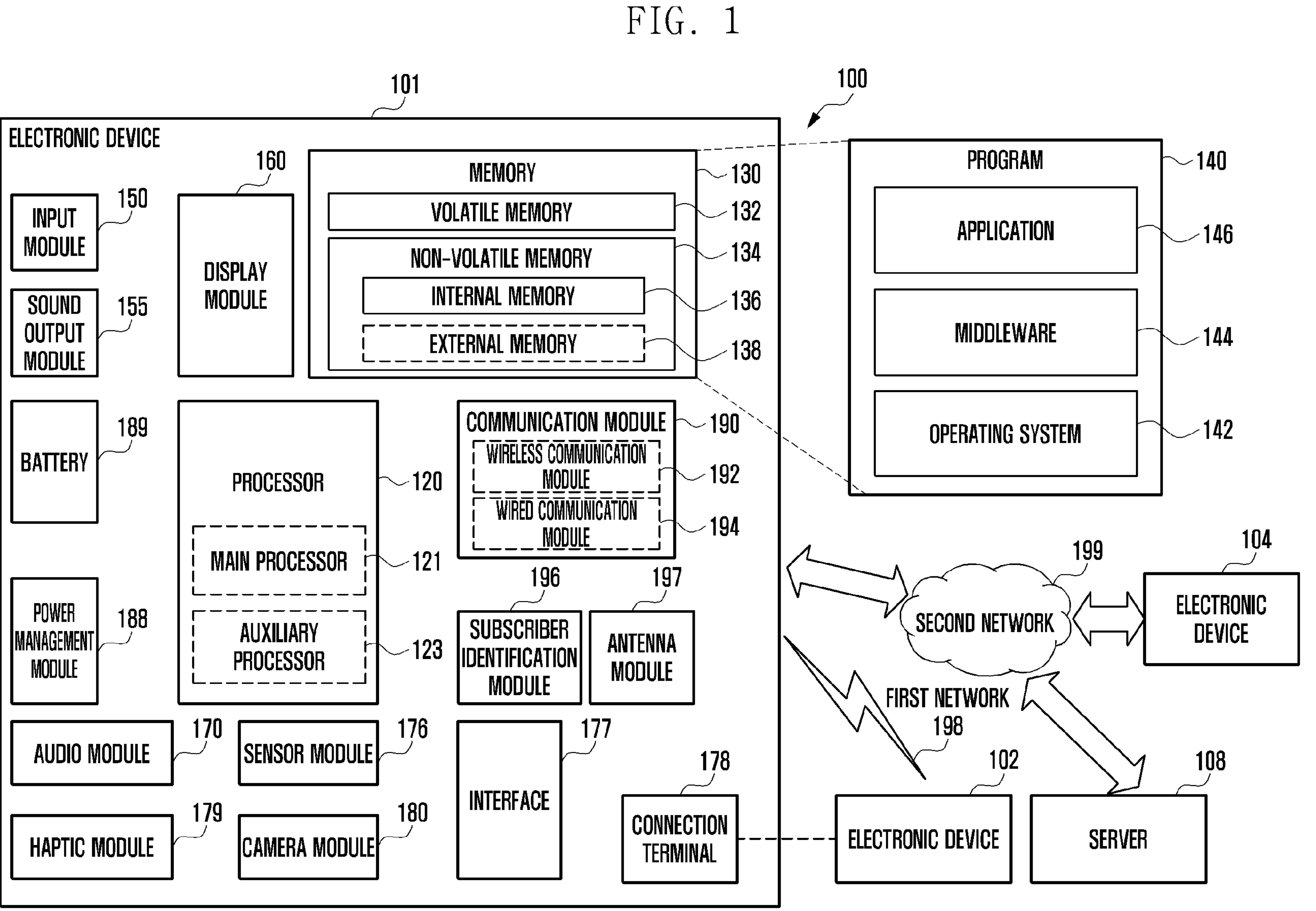
FIG. 1 is a block diagram illustrating an example electronic device according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
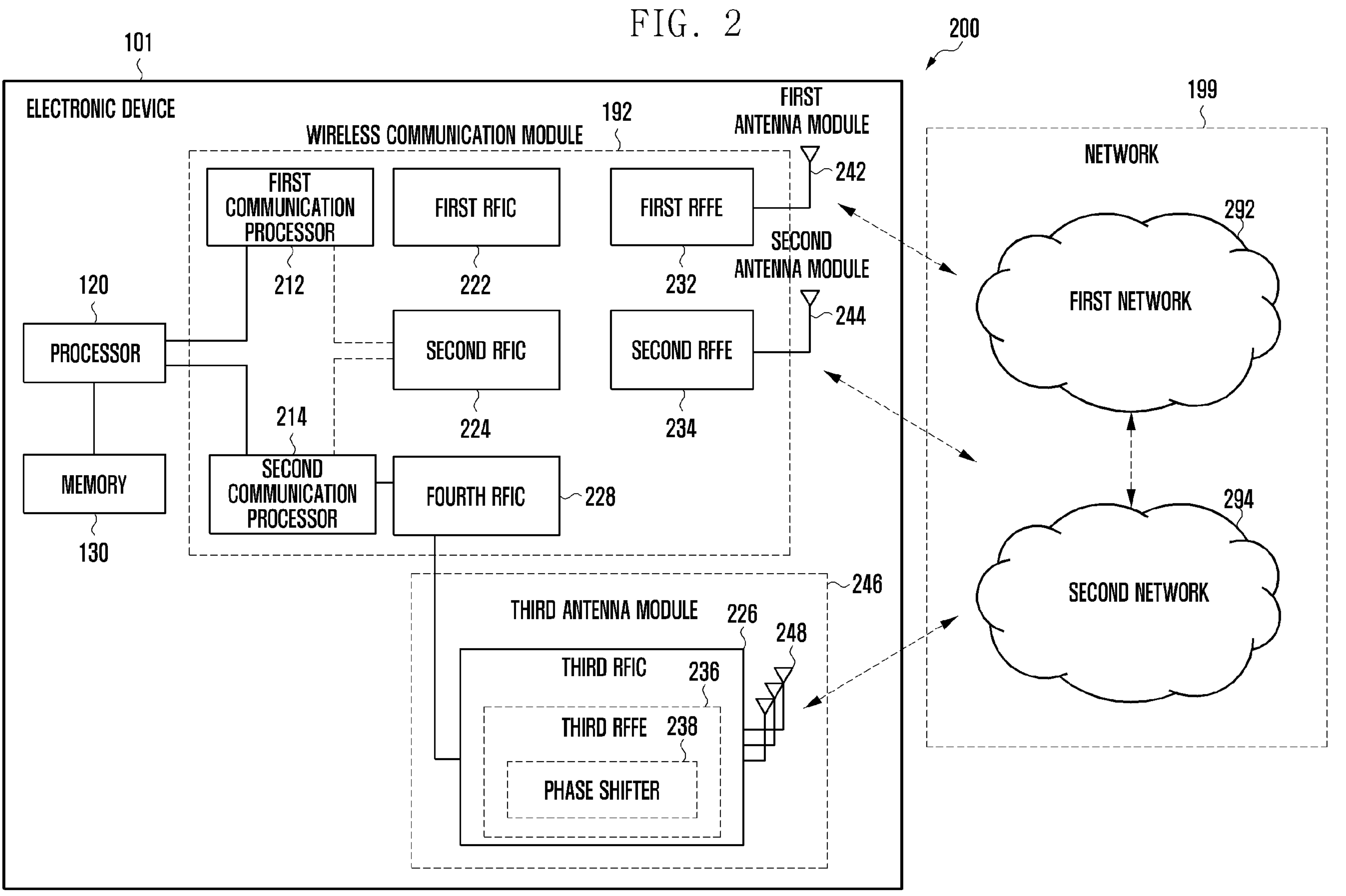
FIG. 2 is a block diagram illustrating an example configuration of an electronic device for supporting legacy network communication and 5G network communication according to various embodiments.

FIG. 2 is a block diagram 200 illustrating an example configuration of an electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in apart (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
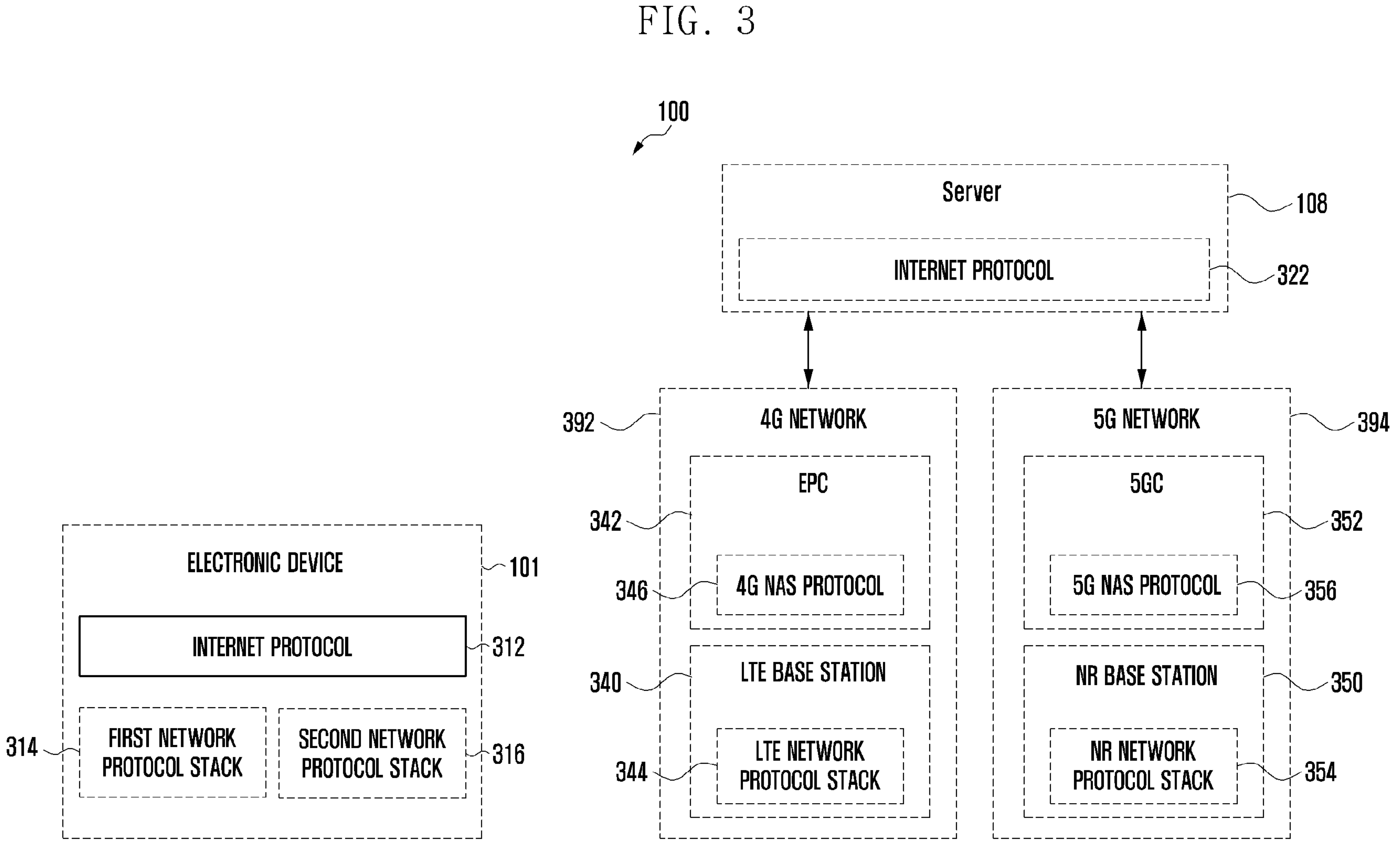
FIG. 3 is a diagram illustrating a protocol stack structure of a network of 4G communication and/or 5G communication according to various embodiments.

FIG. 3 is a diagram illustrating a protocol stack structure of a network 100 of 4G communication and/or 5G communication according to various embodiments.

Referring to FIG. 3, the network 100 according to various embodiments may include the electronic device 101, a 4G network 392, a 5G network 394, and the server 108.

According to various embodiments, the electronic device 101 may include an Internet protocol 312, a first communication protocol stack 314, and a second communication protocol stack 316. For example, the electronic device 101 may communicate with the server 108 via the 4G network 392 and/or 5G network 394.

According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device 101.

According to an embodiment, the electronic device 101 may perform wireless communication with the 4G network 392 using the first communication protocol stack 314. According to an embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission and/or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to an embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a 4G NAS (non-access stratum) protocol 346. The 4G network 392 may perform LTE wireless communication with the electronic device 101 using the LTE communication protocol stack 344 and the 4G NAS protocol 346.

According to various embodiment, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

Figure 4:
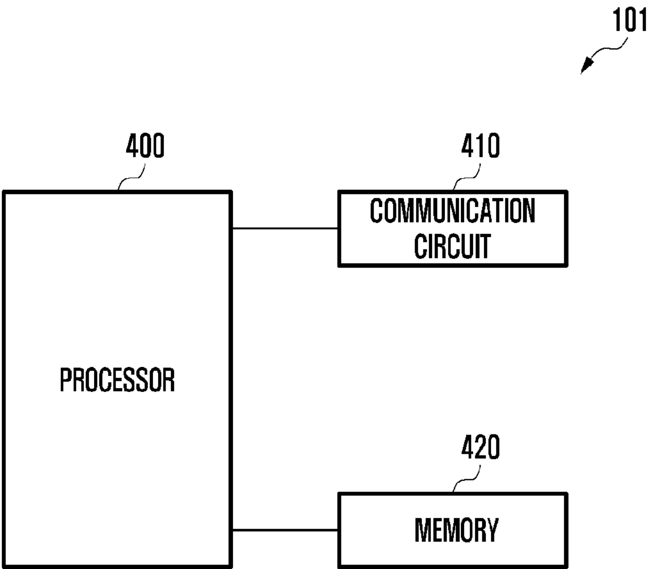
FIG. 4 is a block diagram illustrating an example configuration of an electronic device for channel measurement according to various embodiments.

FIG. 4 is a block diagram illustrating an example configuration of an electronic device for channel measurement according to various embodiments.

According to an embodiment referring to FIG. 4, an electronic device 101 may include a processor (e.g., including processing circuitry) 400, a communication circuit 410, and/or a memory 420. According to an embodiment, the processor 400 may be substantially the same as the processor 120 of FIG. 1 or 2, or the first communication processor 212 of FIG. 2 and/or the second communication processor 214 of FIG. 2, or may be included in the processor 120 or in the first communication processor 212 and/or the second communication processor 214. The communication circuit 410 may be substantially the same as the wireless communication module 192 of FIG. 1 or included in the wireless communication module 192. The memory 420 may be substantially the same as the memory 130 of FIG. 1 or included in the memory 130. According to an embodiment, the processor 400 may be operatively, functionally, and/or electrically connected to the communication circuit 410 and/or the memory 420.

According to an embodiment, the processor 400 may include various processing circuitry and be configured to identify whether channel measurement is performed in a radio resource control (RRC) idle state or an RRC inactive state when a wireless connection with a network (e.g., a base station) is released. According to an embodiment, the processor 400 may be configured to obtain (or receive and/or identify) information, which is related to channel (or frequency) measurement to be performed in an RRC idle state or RRC inactive state, from a message related to RRC connection release (e.g., RRC release) received from a network through the communication circuit 410. For example, information related to channel (or frequency) measurement may be included in a "measIdleConfig" information element (IE) of a message related to RRC connection release. According to an embodiment, in case the processor 400 obtains information related to channel (or frequency) measurement from a message related to RRC connection release, the processor may be configured to determine that channel measurement is performed in an RRC idle state or RRC inactive state. According to an embodiment, in case the processor 400 does not obtain information related to channel (or frequency) measurement from a message related to RRC connection release, or in case information related to channel measurement is invalid (e.g., null), the processor may be configured to determine that channel measurement is not performed in an RRC idle state or an RRC inactive state.

According to an embodiment, the processor 400 may be configured to generate a frequency list for channel measurement in an RRC idle state or RRC inactive state. According to an embodiment, the processor 400 may be configured to generate a frequency list for channel measurement based on a determination that channel measurement is performed in an RRC idle state or RRC inactive state. For example, the frequency list for channel measurement may include at least one frequency among at least one frequency related to cell reselection, identified in system information block (SIB) 4, and at least one frequency related to a carrier aggregation (CA) function and/or dual connectivity (DC) function, identified in SIB 11. For example, a frequency included in the frequency list for channel measurement may be selected based on a priority of a serving frequency of the electronic device 101 and a channel state between the electronic device and a network (or base station). As an example, the serving frequency of the electronic device 101 may indicate a frequency that the electronic device 101 is using or used for access to a serving cell. As an example, the serving cell may indicate a cell to which the electronic device 101 is currently accessed.

According to an embodiment, in case a serving frequency has the highest priority and a channel state of a network satisfying a designated first condition, the processor 400 may be configured to generate a frequency list including at least one frequency identified in SIB 11. For example, at least one frequency identified in SIB 11 may include a priority configured based on a frequency combination of a CA function and/or a DC function preferred by the electronic device 101. For example, the frequency combination of the CA function and/or the DC function preferred by the electronic device 101 may be configured (or selected) based on an operating method of a network to which the electronic device 101 is accessed or a characteristic (e.g., throughput and/or delay) required by an application program executed in the electronic device 101. For example, a frequency included in a frequency combination of a CA function and/or a DC function preferred by the electronic device 101 may be referred to, for example, as a preferred frequency. For example, a state in which the priority of the serving frequency is the highest may include a state in which the priority of the serving frequency is higher than that of at least one frequency (e.g., adjacent frequency) identified in SIB 4. For example, the priority of the serving frequency may be identified in a "cellReselectionPriority" field of SIB 2. For example, the priority of at least one frequency (e.g., adjacent frequency) identified in SIB 4 may be identified in a "cellReselectionPriority" field of SIB 4. As an example, a state in which a channel state of a network satisfies a designated first condition may include a state in which a received signal strength (or received signal level) (e.g., Srxlev) with the network exceeds a first reference value (e.g., s-NonIntraSearchP) configured by the network and a signal quality (or reception quality level) (e.g., Squal) with the network exceeds a second reference value (e.g., s-NonIntraSearchQ) configured by the network. For example, a state in which a channel state of a network satisfies a designated first condition may include a state in which it is determined as a strong electric field and/or mid-strength electric field based on a reference value (e.g., a first reference value and/or a second reference value) configured by the network.

According to an embodiment, in case a serving frequency has the highest priority, a channel state of a network does not satisfy a designated first condition, and the channel state of the network satisfies a designated second condition, the processor 400 may be configured to generate a frequency list including at least one frequency identified in SIB 4 and SIB 11. For example, the priority of at least one frequency identified in the SIB 4 may be configured to be relatively higher than the priority of at least one frequency identified in the SIB 11. For example, a state in which the channel state between the electronic device and the network does not satisfy the designated first condition may include a state in which a received signal strength (or received signal level)

(e.g., Srxlev) with the network has a value equal to or less than a first reference value (e.g., s-NonIntraSearchP) configured by the network and/or a signal quality (or reception quality level) (e.g., Squal) with the network has a value equal to or less than a second reference value (e.g., s-NonIntraSearchQ) configured by the network. For example, a state in which the channel state between the electronic device and the network does not satisfy the designated first condition may include a state in which it is determined to be a weak electric field based on a reference value (e.g., a first reference value and/or a second reference value) configured by the network. As an example, a state in which the channel state between the electronic device and the network satisfies the designated second condition may include a state in which the received signal strength (or received signal level) (e.g., Srxlev) with the network has a value exceeding a third reference value (e.g., about 5 dBm) configured by the electronic device 101. For example, a state in which the channel state between the electronic device and the network satisfies the designated second condition may include a state in which it is determined to be a strong electric field and/or mid-strength electric field based on a reference value (e.g., a third reference value) configured by the electronic device 101.

According to an embodiment, in case the serving frequency has the highest priority and a channel state of a network does not satisfy a designated first condition and a designated second condition, the processor 400 may be configured to generate a frequency list including at least one frequency identified in SIB 4. For example, a state in which the channel state between the electronic device and the network does not satisfy the designated second condition may include a state in which the received signal strength (or received signal level) (e.g., Srxlev) with the network has a value equal to or less than a third reference value configured by the electronic device 101. For example, a state in which the channel state between the electronic device and the network does not satisfy the designated second condition may include a state in which it is determined to be a weak electric field based on a reference value (e.g., a third reference value) configured by the electronic device 101.

According to an embodiment, in case a priority of a serving frequency is not the highest priority, a channel state of a network does not satisfy a designated first condition, and the channel state of the network satisfies a designated second condition, the processor 400 may be configured to generate a frequency list including at least one frequency identified in SIB 4 and SIB 11. For example, a state in which the priority of the serving frequency is not the highest includes a state in which at least one frequency, having a priority equal to or higher than that of the serving frequency, among at least one frequency (e.g., adjacent frequency) identified in SIB 4 exists.

According to an embodiment, in case a priority of a serving frequency is not the highest and a channel state of a network does not satisfy a designated first condition and a designated second condition, the processor 400 may be configured to generate a frequency list including at least one frequency identified in SIB 4.

According to an embodiment, in case a priority of a serving frequency is not the highest priority, a channel state of a network satisfies a designated first condition, and the channel state of the network satisfies a designated third condition, the processor 400 may be configured to generate a frequency list including at least a part of at least one frequency identified in SIB 11 and at least one frequency identified in SIB 4. For example, the priority of at least one frequency identified in SIB 11 may be configured to be relatively higher than the priority of at least one frequency identified in SIB 4. For example, at least a part of the at least one frequency identified in SIB 4 may include at least one frequency, having a priority equal to or higher than that of a serving frequency, among the at least one frequency identified in SIB 4. For example, a state in which the channel state between the electronic device and the network satisfies the designated third condition may include a state in which the received signal strength (or received signal level) (e.g., Srxlev) with the network has a value exceeding a fourth reference value (e.g., about 20 dBm) configured by the electronic device 101. For example, a state in which the channel state between the electronic device and the network satisfies the designated third condition may include a state in which it is determined to be a strong electric field and/or mid-strength electric field based on a reference value (e.g., a fourth reference value) configured by the electronic device 101.

According to an embodiment, in case a priority of a serving frequency is not the highest priority, a channel state of a network satisfies a designated first condition, and the channel state of the network does not satisfy a designated third condition, the processor 400 may be configured to generate a frequency list including at least a part of at least one frequency identified in SIB 4 and at least one frequency identified in SIB 11. For example, the priority of at least one frequency identified in the SIB 4 may be configured to be relatively higher than the priority of at least one frequency identified in the SIB 11. For example, at least a part of the at least one frequency identified in the SIB 4 may include at least one frequency, having a priority equal to or higher than that of a serving frequency, among the at least one frequency identified in the SIB 4. As an example, a state in which the channel state between the electronic device and the network does not satisfy the designated third condition may include a state in which the received signal strength (or received signal level) (e.g., Srxlev) with the network has a value equal to or less than a fourth reference value (e.g., about 20 dBm) configured by the electronic device 101. For example, the state in which the channel state between the electronic device and the network does not satisfy the designated third condition may include a state in which it is determined to be a weak electric field based on a reference value (e.g., a fourth reference value) configured by the electronic device 101.

According to an embodiment, the processor 400 may be configured to control the number of selected frequencies based on a priority of a serving frequency and a channel state of a network (or base station) in order to generate a frequency list. For example, in case the number of frequencies selected based on the priority of serving frequency and the channel state between the electronic device and the network (or base station) exceeds the maximum number of frequencies supported by the electronic device 101, the processor 400 may be configured to exclude, from a frequency list, at least one of the frequencies of SIB 11 selected for generation of the frequency list. For example, the frequency excluded from the frequency list may include at least one frequency having a relatively low priority among at least one frequency identified in SIB 11.

According to an embodiment, the processor 400 may be configured to control the communication circuit 410 to measure at least one frequency included in a frequency list in an RRC idle state or RRC inactive state. According to an embodiment, the processor 400 may be configured to start (e.g., reset) a timer (e.g., T331) to determine a time duration for performing channel measurement in an RRC idle state or RRC inactive state based on a determination that the channel measurement is performed in the RRC idle state or RRC inactive state. According to an embodiment, the processor 400 may be configured to control the communication circuit 410 to sequentially perform measurement based on a priority of at least one frequency included in the frequency list while the timer is running.

According to an embodiment, the processor 400 may be configured to stop running of a timer based on cell reselection while the timer is running. The processor 400 may be configured to update (or generate) a frequency list based on a priority of a frequency (e.g., serving frequency) of a serving cell accessed through cell reselection and a channel state of a network. The processor 400 may be configured to control the communication circuit 410 to sequentially perform measurement based on the priority of at least one frequency included in the updated frequency list for the remaining time of the timer. For example, the remaining time of the timer may include the remaining running time except for a running time up to a time point, at which the running of the timer is stopped based on cell reselection, from the total running time of the timer. For example, measurement may be performed in case an RRC state with a serving cell accessed through cell reselection is in an RRC idle state or RRC inactive state.

According to an embodiment, the processor 400 may be configured to control the communication circuit 410 to end (or limit) channel measurement in the RRC idle state or RRC inactive state in case the running time of the timer expires.

According to an embodiment, in case it is determined that a result of measuring at least one preferred frequency included in a frequency list is valid, the processor 400 may be configured to control the communication circuit 410 to end (or limit) channel measurement in the RRC idle state or RRC inactive state. For example, the preferred frequency may include at least one frequency, which is selected based on a frequency combination of a CA function and/or a DC function preferred by the electronic device 101, among at least one frequency identified in SIB 11. For example, a state in which a result of measuring the preferred frequency is valid may include a state in which a result of measuring the preferred frequency included in the frequency list has a value exceeding a fifth reference value configured by a network. For example, the fifth reference value configured by the network may be identified in the "qualityThreshold" field of the "measIdleConfig" information element of an RRC connection release-related message received from the network.

According to an embodiment, the processor 400 may be configured to control the communication circuit 410 to transmit (or report) a result of channel measurement performed in an RRC idle state or RRC inactive state to a network (or base station). According to an embodiment, the result of channel measurement performed in the RRC idle state or RRC inactive state may be transmitted (or reported) to a network (or base station) based on a request of the network at the time of transition to an RRC connected state. According to an embodiment, the processor 400 may be configured to control the communication circuit 410 to transmit (or report) a result of channel measurement for a preferred frequency performed in an RRC idle state or RRC inactive state to a network (or base station). For example, reporting of channel measurement for at least one remaining frequency except for the preferred frequency among the frequencies included in a frequency list may be limited. According to an embodiment, the processor 400 may be configured to control the communication circuit 410 to transmit (or report) a result of channel measurement for at least one frequency, which is selected based on the priority of the frequencies included in a frequency list, to a network (or base station). For example, the at least one frequency selected based on the priority may include at least one frequency having a relatively high priority among the frequencies included in the frequency list. For example, reporting of channel measurement for at least one frequency, which is not selected based on a priority among frequencies included in the frequency list, may be limited.

According to an embodiment, the processor 400 may be configured to update the priority of a frequency included in the frequency list based on a throughput rating identified based on a channel measurement result. The processor 400 may be configured to control the communication circuit 410 to transmit (or report) a result of channel measurement for at least one frequency, which is selected based on the priority updated based on the throughput rating, to a network (or base station). For example, reporting of channel measurement for at least one frequency, which is not selected based on the updated priority among the frequencies included in the frequency list, may be limited.

According to an embodiment, the communication circuit 410 may be configured to support transmission and/or reception of signals and/or data to and/or from at least one external electronic device (e.g., the electronic device 102 or 104 or the server 108 in FIG. 1). According to an embodiment, the communication circuit 410 may include a first processing part and a second processing part. For example, the first processing part may support transmission and/or reception of a control message and/or data to or from a first node (e.g., a new radio (NR) base station) through first wireless communication. As an example, the first wireless communication may include a 5G communication scheme (e.g., NR communication scheme). For example, the second processing part may support transmission and/or reception of a control message and/or data to and/or from a second node (e.g., a long-term evolution (LTE) base station) through second wireless communication. As an example, the second wireless communication may include at least one of LTE, LTE-advanced (LTE-A), or LTE-advanced pro (LTE-A pro) as a 4G communication scheme. For example, the first processing part and the second processing part may be configured by software that processes signals and protocols of different frequency bands. For example, the first processing part and the second processing part may be distinguished logically (e.g., software). For example, the first processing part and the second processing part may be configured by different circuits or different hardware.

According to an embodiment, the communication circuit 410 may include an RFIC (e.g., the second RFIC 224 of FIG. 2 and/or the third RFIC 226 of FIG. 2) and/or an RFFE (e.g., the RFIC 234 of FIG. 2 and/or the third RFFE 236 of FIG. 2), which are associated with first wireless communication, and an RFIC (e.g., the first RFIC 222 of FIG. 2) and/or an RFFE (e.g., the first RFFE 232 of FIG. 2), which are associated with second wireless communication.

According to an embodiment, the memory 420 may store various data used by at least one element (e.g., the processor 400 and/or the communication circuit 410) of the electronic device 101. For example, the data may include information related to a frequency list for channel measurement in an RRC idle state or RRC inactive state. According to an embodiment, the memory 420 may store instructions that may be executed by the processor 400.

According to an example embodiment, an electronic device (e.g., the electronic device 101 of FIG. 1, 2, 3, or 4)

may include: a communication circuit (e.g., the wireless communication module 192 of FIG. 1 or the communication circuit 410 of FIG. 4), and at least one processor (e.g., the processor 120 of FIG. 1 or the processor 400 of FIG. 4) operatively connected to the communication circuit, wherein the processor may be configured to: obtain information related to measurement from a message related to release of a radio resource control (RRC) connection of the electronic device to a network; identify frequencies for measurement while the electronic device is in an RRC idle state (RRC idle) or RRC inactive state (RRC inactive) with a network; generate a frequency list including at least one of frequencies for measurement based on a priority of a frequency used for access between the electronic device and the network and a channel state between the electronic device and the network; sequentially perform measurement based on a priority of at least one frequency included in the frequency list while the electronic device is in an RRC idle state or RRC inactive state with a network; and control the communication circuit to transmit a result of the measurement to the network based on transition to an RRC connected state.

According to an example embodiment, the frequencies for measurement may include at least one frequency included in system information block (SIB) 4 and SIB 11.

According to an example embodiment, based on the priority of the frequency used for access between the electronic device and the network being higher than a priority of at least one frequency included in system information block (SIB) 4, a signal strength with the network having a value exceeding a first reference value configured by the network, and the signal quality with the network having a value exceeding a second reference value configured by the network, the at least one processor may be configured to generate the frequency list based on the at least one frequency included in SIB 11.

According to an example embodiment, based on the priority of the frequency used for access between the electronic device and the network being higher than the priority of at least one frequency included in SIB 4, a signal strength with the network having a value equal to or less than a first reference value configured by the network or a signal quality with the network having a value equal to or less than a second reference value configured by the network, and the signal strength with the network having a value equal to or less than a third reference value configured by the electronic device, the at least one processor may be configured to generate the frequency list based on the at least one frequency included in SIB 4.

According to an example embodiment, based on the priority of the frequency used for access between the electronic device and the network being higher than the priority of at least one frequency included in SIB 4, a signal strength with the network having a value equal to or less than a first reference value configured by the network or a signal quality with the network having a value equal to or less than a second reference value configured by the network, and the signal strength with the network having a value exceeding a third reference value configured by the electronic device, the at least one processor may be configured to generate the frequency list based on the at least one frequency included in the SIB 4 and SIB 11, wherein, in the frequency list, the priority of the at least one frequency included in the SIB 4 is configured to be higher than the priority of the at least one frequency included in the SIB 11.

According to an example embodiment, based on at least one frequency having a priority equal to or higher than that of a frequency, which is used for access between the electronic device and the network, among at least one frequency included in SIB 4 existing, a signal strength with the network having a value exceeding a first reference value configured by the network, a signal quality with the network having a value exceeding a second reference value configured by the network, and the signal strength with the network having a value exceeding a fourth reference value configured by the electronic device, the at least one processor may be configured to generate the frequency list based on at least a part of the at least one frequency included in SIB 11 and the at least one frequency included in SIB 4, wherein, in the frequency list, the priority of the at least one frequency included in the SIB 11 is configured to be higher than the priority of the at least one frequency included in the SIB 4.

According to an example embodiment, based on at least one frequency having a priority equal to or higher than that of a frequency used for access between the electronic device and the network, among at least one frequency included in SIB 4 existing, a signal strength with the network having a value exceeding a first reference value configured by the network, a signal quality with the network having a value exceeding a second reference value configured by the network, and the signal strength with the network having a value equal to or less than a fourth reference value configured by the electronic device, the at least one processor may be configured to generate a frequency list based on at least a part of the at least one frequency included in SIB 11 and the at least one frequency included in SIB 4, wherein, in the frequency list, the priority of the at least one frequency included in the SIB 4 is configured to be higher than that of the at least one frequency included in the SIB 11.

According to an example embodiment, based on at least one frequency having a priority equal to or higher than that of a frequency used for access between the electronic device and the network, among at least one frequency included in SIB 4 existing, a signal strength with the network having a value equal to or less than a first reference value configured by the network or a signal quality with the network having a value equal to or less than a second reference value configured by the network, and the signal strength with the network having a value equal to or less than a third reference value configured by the electronic device, the at least one processor may be configured to generate a frequency list based on the at least one frequency included in the SIB 4.

According to an example embodiment, based on at least one frequency having a priority equal to or higher than that of a frequency used for access between the electronic device and the network, among at least one frequency included in SIB 4 existing, a signal strength with the network having a value equal to or less than a first reference value configured by the network or a signal quality with the network having a value equal to or less than a second reference value configured by the network, and the signal strength with the network having a value exceeding a third reference value configured by the electronic device, the at least one processor may be configured to generate a frequency list based on the at least one frequency included in the SIB 4 and the SIB 11, wherein, in the frequency list, the priority of the at least one frequency included in the SIB 4 is configured to be higher than the priority of the at least one frequency included in the SIB 11.

According to an example embodiment, based on the number of frequencies included in the frequency list exceeding a maximum number of frequencies configured for the measurement, the at least one processor may be configured to exclude a part of at least one frequency included in SIB 11 from the frequency list.

Figure 5:
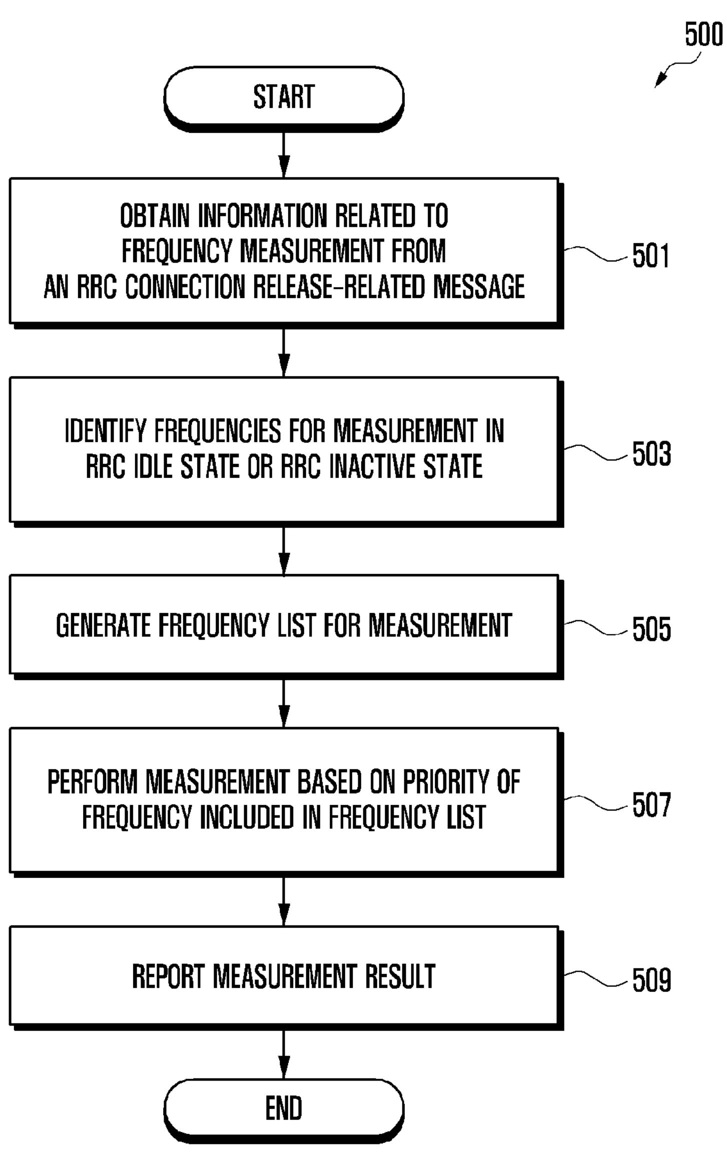
FIG. 5 is a flowchart illustrating example channel measurement in an electronic device according to various embodiments.

FIG. 5 is a flowchart 500 illustrating example channel measurement in an electronic device according to various embodiments. In the following example embodiments, respective operations may be performed sequentially, but are not necessarily performed sequentially. For example, the sequence of respective operations may be changed, and at least two operations may be performed in parallel. As an example, the electronic device may correspond to the electronic device 101 of FIG. 1, FIG. 2, FIG. 3 or FIG. 4.

According to the example embodiment referring to FIG. 5, in operation 501, an electronic device (e.g., the processor 120 of FIG. 1 or the processor 400 of FIG. 4) may be configured to obtain (or, receive and/or identify) information related to channel (frequency) measurement from an RRC connection release-related message received from a network (or base station). According to an embodiment, the processor 400 may be configured to obtain information related to channel (or frequency) measurement, which is to be performed in an RRC idle state or RRC inactive state, from the RRC connection release-related message (e.g., RRC release) received from the network through the communication circuit 410. The processor 400 may be configured to determine that the channel measurement is performed in the RRC idle state or RRC inactive state, based on acquisition of the information related to channel (or frequency) measurement from the RRC connection release-related message. For example, the information related to channel (or frequency) measurement may be included in a "measIdleConfig" information element (IE) of a message related to RRC connection release as illustrated in Table 1 (e.g., 3GPP TS 38.331 standard).

TABLE 1

| | | |
|---|---|---|
| RRCRelease-v1540-IEs ::= | SEQUENCE { | |
| waitTime | RejectWaitTime | OPTIONAL, --Need N |
| nonCriticalExtension | RRCRelease-v1610-IEs | OPTIONAL |
| } | | |
| RRCRelease-v1610-IEs ::= | SEQUENCE { | |
| voiceFallbackIndication-r1 | ENUMERATED{true} | OPTIONAL, --Need N |
| measIdleConfig-r16 | SetupRelease {MeasIdleConfigDedicated-r16} | OPTIONAL, --Need M |
| nonCriticalExtension | RRCRelease-v1650-IEs | OPTIONAL, --Need R |
| } | | |

According to an embodiment, in operation 503, the electronic device (e.g., the processor 120 or 400) may be configured to identify frequencies for channel measurement in an RRC idle state or RRC inactive state. For example, the frequency for performing channel measurement in the RRC idle state or RRC inactive state may include at least one frequency related to cell reselection, included in system information block (SIB) 4, and at least one frequency related to a carrier aggregation (CA) function and/or a dual connectivity (DC) function, included in SIB 11. For example, at least one frequency related to cell reselection may be identified in the "interFreqCarrierFreqList" field of SIB 4 as illustrated in Table 2 (e.g., 3GPP TS 38.331 standard).

TABLE 2

| | | |
|---|---|---|
| SIB4 ::= | SEQUENCE { | |
| interFreqCarrierFreqList | InterFreqCarrierFreqList, | |
| lateNonCriticalExtension | OCTET STRING | OPTIONAL, |
| ..., | | |
| [[ | | |
| InterFreqCarrierFreqList-v1610 | InterFreqCarrierFreqList-v1610 | OPTIONAL -- Need R |
| ]] | | |
| } | | |
| InterFreqCarrierFreqList ::= | SEQUENCE (SIZE (1..maxFreq)) OF InterFreqCarrierFreqInfo | |
| InterFreqCarrierFreqList-v1610 ::= v1610 | SEQUENCE (SIZE (1..maxFreq)) OF InterFreqCarrierFreqInfo- | |
| InterFreqCarrierFreqInfo ::= | SEQUENCE { | |
| dl-CarrierFreq | ARFCN-ValueNR, | |
| frequencyBandList | MultiFrequencyBandListNR-SIB | OPTIONAL, -- Cond Mandatory |
| frequencyBandListSUL | MultiFrequencyBandListNR-SIB | OPTIONAL, -- Need R |
| nrofSS-BlocksToAverage | INTEGER(2..maxNrofSS-BlocksToAverage) | OPTIONAL, -- Need S |
| absThreshSS-BlocksConsolidation | ThresholdNR | OPTIONAL, -- Need S |
| smtc | SSB-MTC | OPTIONAL, -- Need S |
| ssbSubcarrierSpacing | SubcarrierSpacing, | |
| ssb-ToMeasure | SSB-ToMeasure | OPTIONAL, -- Need S |
| deriveSSB-IndexFromCell | BOOLEAN, | |
| ss-RSSI-Measurement | SS-RSSI-Measurement | OPTIONAL, -- Need R |
| q-RxLevMin | Q-RxLevMin, | |
| q-RxLevMinSUL | Q-RxLevMin | OPTIONAL, -- Need R |
| q-QualMin | Q-QualMin | OPTIONAL, -- Need S |
| p-Max | P-Max | OPTIONAL, -- Need S |
| t-ReselectionNR | T-Reselection, | |
| t-ReselectionNR-SF | Speed StateScaleFactors | OPTIONAL, -- Need S |
| threshX-HighP | ReselectionThreshold, | |
| threshX-LowP | Reselection Threshold, | |

TABLE 2-continued

```
  threshX-Q                          SEQUENCE {
    threshX-HighQ                        ReselectionThresholdQ
    threshX-LowQ                         ReselectionThresholdQ
  }
OPTIONAL, -- Cond RSRQ
  cellReselectionPriority            CellReselectionPriority         OPTIONAL,  -- Need R
  cellReselectionSubPriority         CellReselectionSubPriority      OPTIONAL,  -- Need R
  q-OffsetFreq                       Q-OffsetRange                   DEFAULT dB0,
  interFreqNeighCellList             InterFreqNeighCellList          OPTIONAL,  -- Need R
  interFreqBlackCellList             InterFreqBlackCellList          OPTIONAL,  -- Need R
  ...
}
```

For example, at least one frequency related to the CA function and/or the DC function may be identified in the "measIdleConfigSIB" field of SIB 11 as illustrated in Table 3 (e.g., 3GPP TS 38.331 standard).

TABLE 3

```
MeasIdleConfigSIB-r16 ::= SEQUENCE {
  measIdleCarrierListNR-r16            SEQUENCE (SIZE
                                       (1..maxFreqIdle-r16)) OF
MeasIdleCarrierNR-r16              OPTIONAL,   -- Need S
  measIdleCarrierListEUTRA-r16         SEQUENCE (SIZE
                                       (1..maxFreqIdle-r16)) OF
MeasIdleCarrierEUTRA-r16           OPTIONAL,   -- Need S
  ...
}
```

According to an embodiment, in operation 505, the electronic device (e.g., the processor 120 or 400) may be configured to generate a frequency list for channel measurement in an RRC idle state or RRC inactive state. According to an embodiment, the processor 400 may be configured to generate a frequency list including at least one frequency, which is selected based on a priority of a serving frequency of the electronic device 101 and a channel state of a network (or base station), among frequencies for performing channel measurement in the RRC idle state or RRC inactive state. For example, the serving frequency of the electronic device 101 may indicate a frequency used for access to a cell (e.g., serving cell) to which the electronic device 101 is currently accessed. For example, the priority of the serving frequency may be identified in the "cellReselectionPriority" field of SIB 2 illustrated in Table 4 (e.g., 3GPP TS 38.331 standard).

TABLE 4

```
SIB2 ::=                               SEQUENCE {
  cellReselectionInfoCommon              SEQUENCE {
    nrofSS-BlocksToAverage                 INTEGER              (2..maxNrofSS-BlocksToAverage)
OPTIONAL,   -- Need S
    absThreshSS-BlocksConsolidation        ThresholdNR          OPTIONAL,   -- Need S
    range ToBestCell                       Range ToBestCell     OPTIONAL,   -- Need R
    q-Hyst ENUMERATED {dB0, dB1, dB2, dB3, dB4, dB5, dB6, dB8, dB10,
               dB12, dB14, dB16, dB18, dB20, dB22, dB24},
    speedStateReselectionPars            SEQUENCE {
      mobilityStateParameters                MobilityStateParameters,
      q-HystSF                               SEQUENCE {
        sf-Medium                            ENUMERATED {dB-6, dB-4, dB-2, dB0},
        sf-High                              ENUMERATED {dB-6, dB-4, dB-2, dB0}
      }
    }                                        OPTIONAL,   -- Need R
  ...
  },
  cellReselectionServingFreqInfo       SEQUENCE {
    s-NonIntraSearchP                  Reselection Threshold        OPTIONAL,   -- Need S
    s-NonIntraSearchQ                  Reselection ThresholdQ       OPTIONAL,   -- Need S
    threshServingLowP                  ReselectionThreshold,
    threshServingLowQ                  Reselection ThresholdQ       OPTIONAL,   -- Need R
    cellReselectionPriority            CellReselectionPriority,
    cellReselectionSubPriority         CellReselectionSubPriority   OPTIONAL,   -- Need R
    ...
  },
```

According to an embodiment, in operation 507, the electronic device (e.g., the processor 120 or 400) may be configured to sequentially perform measurement based on a priority of at least one frequency included in the frequency list in an RRC idle state or RRC inactive state. According to an embodiment, while a timer (e.g., T331) for determining a time duration for performing channel measurement is running, the processor 400 may be configured to control the communication circuit 410 to sequentially perform measurement based on the priority of at least one frequency included in the frequency list. For example, the timer may be started (e.g., reset) based on a determination that channel measurement is performed in an RRC idle state or RRC inactive state. According to an embodiment, the processor 400 may be configured to control the communication circuit 410 to end (or limit) channel measurement in the RRC idle state or RRC inactive state when the running time of the timer expires.

According to an embodiment, in operation 509, the electronic device (e.g., the processor 120 or 400) may be configured to transmit (or report) a result of channel measurement performed in an RRC idle state or RRC inactive state to a network (or base station) based on transition to an RRC connected state. According to an embodiment, the result of channel measurement performed in the RRC idle state or RRC inactive state may be transmitted (or reported) to a network (or base station) based on a request of the network (or base station) at the time of transition to the RRC connected state. According to an embodiment, the processor 400 may be configured to control the communication circuit 410 to transmit (or report) a result of channel measurement for a preferred frequency, among a result of channel measurement performed in an RRC idle state or RRC inactive state, to a network (or a base station). For example, reporting of channel measurement for at least one remaining frequency, which is not included in the preferred frequency, among the frequencies included in the frequency list, may be limited. According to an embodiment, the processor 400 may be configured to control the communication circuit 410 to transmit (or report) a result of channel measurement for at least one frequency, which is selected based on the priority of the frequencies included in the frequency list, to a network (or base station). For example, the at least one frequency selected based on the priority may include at least one frequency having a relatively high priority among the frequencies included in the frequency list. For example, reporting of channel measurement for at least one frequency, which is not selected based on a priority, among frequencies included in the frequency list, may be limited. According to an embodiment, the processor 400 may be configured to update the priority of a frequency included in the frequency list based on a throughput rating identified based on a channel measurement result. The processor 400 may be configured to control the communication circuit 410 to transmit (or report) a result of channel measurement for at least one frequency, which is selected based on the priority updated based on the throughput rating, to a network (or base station). For example, the throughput rating of a frequency may be obtained based on a bandwidth of a frequency and a reference signal received power (RSRP) weight. For example, reporting of channel measurement for at least one frequency, which is not selected based on the updated priority, among the frequencies included in the frequency list may be limited.

FIG. 6 is a flowchart 600 illustrating example generation of a frequency list for channel measurement in an electronic device according to various embodiments. According to an embodiment, at least a part of FIG. 6 may include a detailed operation of operation 505 of FIG. 5. In the following example embodiments, respective operations may be performed sequentially, but are not necessarily performed sequentially. For example, the sequence of respective operations may be changed, or at least two operations may be performed in parallel. As an example, the electronic device may correspond to the electronic device 101 of FIG. 1, FIG. 2, FIG. 3 or FIG. 4.

According to an embodiment referring to FIG. 6, in operation 601, the electronic device (e.g., the processor 120 of FIG. 1 or the processor 400 of FIG. 4) may be configured to identify whether a priority of a serving frequency corresponds to the highest priority. According to an embodiment, the processor 400 may be configured to compare the priority of the serving frequency with the priority of at least one frequency related to cell reselection (e.g., adjacent frequency) identified in SIB 4. For example, in case the priority of the serving frequency is higher than the priority of at least one frequency (e.g., adjacent frequency) related to cell reselection identified in SIB 4, the processor 400 may be configured to determine that the serving frequency has the highest priority. For example, in case at least one frequency, having a priority equal to or higher than that of the serving frequency, among at least one frequency (e.g., adjacent frequency) related to cell reselection identified in SIB 4 exists, the processor 400 may be configured to determine that the priority of the serving cell is not the highest priority. For example, the priority of at least one frequency (e.g., adjacent frequency) identified in SIB 4 may be identified in the "cellReselectionPriority" field of SIB 4 illustrated in Table 2 (e.g., 3GPP TS 38.331 standard).

According to an embodiment, in case the serving frequency has the highest priority (e.g., 'Yes' in operation 601), the electronic device (e.g., the processor 120 or 400) may be configured to identify whether a channel state of a network satisfies a designated first condition in operation 603. According to an embodiment, the processor 400 may be configured to determine whether a designated first condition is satisfied, based on a result of comparison between a received signal strength (or received signal level) (e.g., Srxlev) with a network and a first reference value (e.g., s-NonIntraSearchP) configured by the network, and a result of comparison between a signal quality (or reception quality level) (e.g., Squal) with a network and a second reference value (e.g., s-NonIntraSearchQ) configured by the network. For example, in case the received signal strength (or received signal level) with the network exceeds the first reference value configured by the network, and the signal quality (or received quality level) with the network exceeds the second reference value configured by the network, the processor may be configured to determine that the channel state between the electronic device and the network satisfies the designated first condition. For example, a state in which the channel state between the electronic device and the network satisfies the designated first condition may include a state in which it is determined to be a strong electric field and/or mid-strength electric field based on a reference value (e.g., a first reference value and/or a second reference value) configured by the network. For example, in case the received signal strength (or received signal level) with the network has a value equal to or less than the first reference value configured by the network and/or the signal quality (or received quality level) with the network has a value equal to or less than the second reference value configured by the network, the processor 400 may be configured to determine that the channel state between the electronic device and the network does not satisfy the designated first condition. As an example, a state in which the channel state between the electronic device and the network does not satisfy the designated first condition may include a state in which it is determined to be a weak electric field based on a reference value (e.g., a first reference value and/or a second reference value) configured by the network.

According to an embodiment, in case the channel state between the electronic device and the network satisfies the designated first condition (e.g., 'Yes' in operation 603), the electronic device (e.g., the processor 120 or 400) may be configured to generate a frequency list including at least one frequency identified in SIB 11 in operation 605. According to an embodiment, in case the serving frequency has the highest priority and the channel state between the electronic device and the network satisfies the designated first condition, the processor 400 may be configured to generate a frequency list based on the frequencies identified in SIB 11, as illustrated in Table 5.

TABLE 5

| SIB 11 |
|---|
| n66 carrierfreq 2 |
| n5 carrierfreq 1 |
| n260 carrierfreq 1 |
| n77 carrierfreq 1 |

According to an embodiment, at least one frequency identified in the SIB 11 may include a priority configured based on a frequency combination of a CA function and/or a DC function preferred by the electronic device 101. For example, the processor 400 may be configured to determine, as preferred frequencies, "FR2 (FR1+FR2 (n260, n261, . . . ) for NRDC)", "FR1-UWB (ultra-wide band [n77/n41, . . . ] for NRCA w/FR1-UWB)", and "FR1 supporting High layers (for NRCA w/FR1 high layers)", based on a frequency combination of a CA function and/or a DC function to support the highest throughput. The processor 400 may be configured to prioritize frequencies included in a frequency list as shown in Table 6 based on the preferred frequencies. For example, the priority of frequencies not included in the preferred frequencies may be configured based on at least one priority identified in SIB4.

TABLE 6

| SIB 11 | internal priority | reason |
|---|---|---|
| n260 carrierfreq 1 | 1 | decision based on UE preference |
| n77 carrierfreq 1 | 2 | (FR2 → FR1 UWB) |
| n66 carrierfreq 2 | 3 | decision based on n/w preference |
| n5 carrierfreq 1 | 4 | (follow cellReselectionPriority) |

For example, the frequency combination of the CA function and/or the DC function preferred by the electronic device 101 may be configured (or selected) based on an operating method of a network to which the electronic device 101 is connected or a characteristic (e.g., transmission rate and/or delay) required by an application program executed in the electronic device 101. For example, the preferred frequency may include a frequency included in a frequency combination of a CA function and/or a DC function preferred by the electronic device 101.

According to an embodiment, in case the channel state between the electronic device and the network does not satisfy the designated first condition (e.g., 'No' in operation 603), the electronic device (e.g., the processor 120 or 400) may be configured to identify whether the channel state between the electronic device and the network satisfies a designated second condition in operation 607. According to an embodiment, the processor 400 may be configured to identify whether the channel state between the electronic device and the network satisfies the designated second condition, based on a result of comparison between a received signal strength (or received signal level) (e.g., Srxlev) with the network and a third reference value (e.g., about 5 dBm) configured by the electronic device 101. For example, in case the received signal strength (or received signal level) (e.g., Srxlev) with the network exceeds the third reference value (e.g., about 5 dBm) configured by the electronic device 101, the processor 400 may be configured to determine that the channel state between the electronic device and the network satisfies the designated second condition. For example, a state in which the channel state between the electronic device and the network satisfies the designated second condition may include a state in which it is determined to be a strong electric field and/or mid-strength electric field based on a reference value (e.g., the third reference value) configured by the electronic device 101. For example, when the received signal strength (or received signal level) (e.g., Srxlev) with the network has a value equal to or less than the third reference value (e.g., about 5 dBm) configured by the electronic device 101, the processor 400 may be configured to determine that the channel state between the electronic device and the network does not satisfy the designated second condition. For example, the state in which the channel state between the electronic device and the network does not satisfy the designated second condition may include a state in which it is determined to be a weak electric field based on a reference value (e.g., a third reference value) configured by the electronic device 101.

According to an embodiment, in case the channel state between the electronic device and the network satisfies a designated second condition (e.g., 'Yes' in operation 607), the electronic device (e.g., the processor 120 or 400) may be configured to generate a frequency list including at least one frequency identified in SIB 4 and SIB 11 in operation 609. According to an embodiment, in case the serving frequency has the highest priority, the channel state between the electronic device and the network does not satisfy the designated first condition, and the channel state between the electronic device and the network satisfies the designated second condition, the processor 400 may be configured to generate a frequency list including at least one frequency identified in SIB 4 and SIB 11. For example, the priority of at least one frequency identified in SIB 4, among the frequencies included in the frequency list, may be configured to be relatively higher than the priority of at least one frequency identified in SIB 11. For example, the priority of at least one frequency identified in SIB 4 among the frequencies included in the frequency list may be identified in the "cellReselectionPriority" field of SIB 4. For example, the priority of at least one frequency identified in SIB 11, among the frequencies included in the frequency list, may be configured based on a frequency combination of a CA function and/or a DC function preferred by the electronic device 101.

According to an embodiment, in case the channel state between the electronic device and the network does not satisfy the designated second condition (e.g., 'No' in operation 607), the electronic device (e.g., the processor 120 or 400) may be configured to generate a frequency list including at least one frequency identified in SIB 4 in operation 611. According to an embodiment, in case the serving frequency has the highest priority and the channel state between the electronic device and the network does not satisfy the designated first condition and designated second condition, the processor 400 may be configured to generate a frequency list based on frequencies identified in SIB 4 as illustrated in Table 7.

TABLE 7

| cellReselectionPriority (SIB4/SIB2) | SIB4 | serving |
|---|---|---|
| 6 | n77 carrierfreq 1 | |
| 5.4 | n66 carrierfreq 1 | ***** |
| 2.8 | n5 carrierfreq 1 | |

For example, the priority of frequencies in the frequency list may be configured such that "n77 carrierfreq 1" has the highest priority, and "n66 carrierfreq 1" has the second highest priority, and "n5 carrierfreq 1" has the lowest priority based on the priority identified in the "cellReselectionPriority" field of SIB 4.

According to an embodiment, in case the priority of the serving frequency is not the highest priority (e.g., 'No' in operation 601), the electronic device (e.g., the processor 120 or 400) may be configured to identify whether the channel state between the electronic device and the network satisfies the designated first condition in operation 613.

According to an embodiment, in case the channel state between the electronic device and the network does not satisfy the designated first condition (e.g., 'No' in operation 613), the electronic device (e.g., the processor 120 or 400) may be configured to identify whether the channel state between the electronic device and the network satisfies the designated second condition in operation 607.

According to an embodiment, in case the channel state between the electronic device and the network satisfies the designated second condition (e.g., 'Yes' in operation 607), the electronic device (e.g., the processor 120 or 400) may be configured to generate a frequency list including at least one frequency identified in SIB 4 and SIB 11 in operation 609.

According to an embodiment, in case the channel state between the electronic device and the network does not satisfy the designated second condition (e.g., 'No' in operation 607), the electronic device (e.g., the processor 120 or 400) may be configured to generate a frequency list including at least one frequency identified in SIB 4 in operation 611.

According to an embodiment, in case the channel state between the electronic device and the network satisfies the designated first condition (e.g., 'Yes' in operation 613), the electronic device (e.g., the processor 120 or 400) may be configured to identify whether the channel state between the electronic device and the network satisfies a designated third condition in operation 615. According to an embodiment, the processor 400 may be configured to determine whether the channel state between the electronic device and the network satisfies the designated third condition based on a result of comparison between the received signal strength (or received signal level) (e.g., Srxlev) with the network and a fourth reference value (e.g., about 20 dBm) configured by the electronic device 101. For example, in case the received signal strength (or received signal level) (e.g., Srxlev) with the network exceeds the fourth reference value (e.g., about 20 dBm) configured by the electronic device 101, the processor 400 may be configured to determine that the channel state between the electronic device and the network satisfies the designated third condition. For example, a state in which the channel state between the electronic device and the network satisfies the designated third condition may include a state in which it is determined to be a strong electric field and/or mid-strength electric field based on a reference value (e.g., a fourth reference value) configured by the electronic device 101. For example, in case the received signal strength (or received signal level) (e.g., Srxlev) with the network has a value equal to or less than the fourth reference value (e.g., about 20 dBm) configured by the electronic device 101, the processor 400 may be configured to determine that the channel state between the electronic device and the network does not satisfy the designated third condition. For example, the state in which the channel state between the electronic device and the network does not satisfy the designated third condition may include a state in which it is determined to be a weak electric field based on a reference value (e.g., a fourth reference value) configured by the electronic device 101.

According to an embodiment, in case the channel state between the electronic device and the network satisfies the designated third condition (e.g., 'Yes' in operation 615), the electronic device (e.g., the processor 120 or 400) may be configured to generate a frequency list including at least a part of at least one frequency identified in SIB 11 and at least one frequency identified in SIB 4 in operation 617. For example, the priority of at least one frequency identified in SIB 11, among the frequencies included in the frequency list, may be configured to be relatively higher than the priority of at least one frequency identified in SIB 4. For example, at least a part of the at least one frequency identified in SIB 4 included in the frequency list may include at least one frequency, having a priority equal to or higher than that of the serving frequency, among the at least one frequency identified in SIB 4.

According to an embodiment, in case the channel state between the electronic device and the network does not satisfy the designated third condition (e.g., 'No' in operation 615), the electronic device (e.g., the processor 120 or 400) may be configured to generate a frequency list including at least a part of at least one frequency identified in SIB 4 and at least one frequency identified in SIB 11 in operation 619. For example, the priority of at least one frequency identified in SIB 4, among the frequencies included in the frequency list, may be configured to be relatively higher than the priority of at least one frequency identified in SIB 11. For example, at least a part of the at least one frequency identified in SIB 4 included in the frequency list may include at least one frequency, having a priority equal to or higher than that of the serving frequency, among the at least one frequency identified in SIB 4. As an example, the frequency list may be generated as illustrated in Table 8.

TABLE 8

| reselection measurements | higher priority group | n77 carrierfreq 1 |
|---|---|---|
| idle mode CA/DC measurements | decision based on UE preference (FR2 → FR1 UWB) | n260 carrierfreq 1<br>n77 carrierfreq 1 |
| | decision based on n/w preference (follow cellReselectionPriority) | n66 carrierfreq 2<br>n5 carrierfreq 1 |

Figure 7:
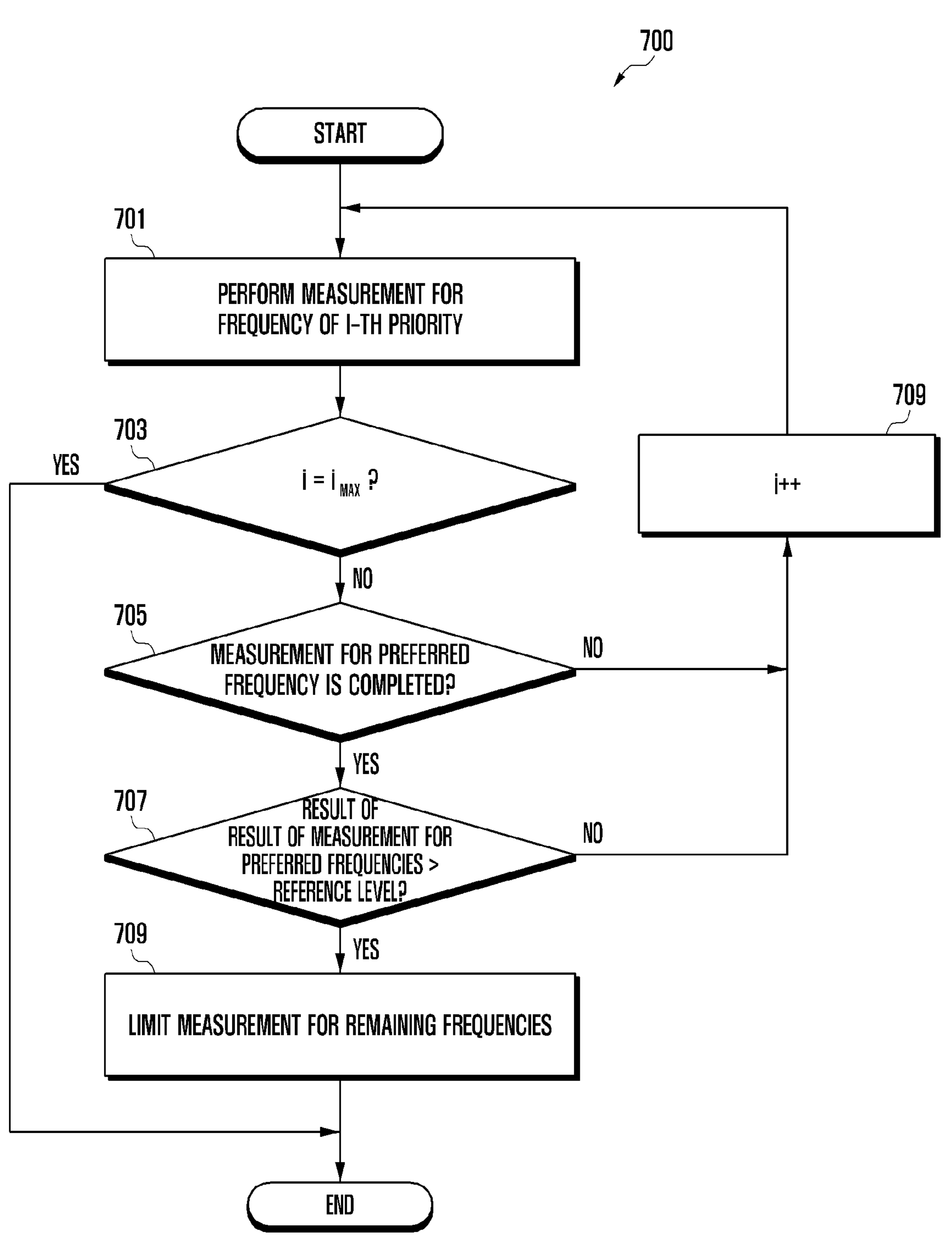
FIG. 7 is a flowchart illustrating example adaptive performance of channel measurement in an electronic device according to various embodiments.

FIG. 7 is a flowchart 700 illustrating an example of adaptively performing channel measurement in an electronic device according to various embodiments. According to an embodiment, at least a part of FIG. 7 may include a detailed operation of operation 507 of FIG. 5. In the following embodiments, respective operations may be performed sequentially, but are not necessarily performed sequentially. For example, the sequence of respective operations may be changed, or at least two operations may be performed in parallel. As an example, an electronic device may correspond to the electronic device 101 of FIG. 1, FIG. 2, FIG. 3 or FIG. 4.

According to an embodiment referring to FIG. 7, in operation 701, the electronic device (e.g., the processor 120 of FIG. 1 or the processor 400 of FIG. 4) may be configured to perform measurement for a frequency having the i-th priority, included in a frequency list in an RRC idle state or RRC inactive state. For example, the frequency list may be generated based on the priority of a serving frequency of the electronic device 101 and the channel state between the electronic device and a network (or base station), as shown in operation 505 of FIG. 5 or operations 601 to 619 of FIG. 6. For example, '1' may be configured as an initial value of an index indicating the i-th priority of frequencies included in the frequency list.

According to an embodiment, the electronic device (e.g., the processor 120 or 400) may be configured to identify whether measurements for all frequencies included in the frequency list have been performed, in operation 703. According to an embodiment, the processor 400 may be configured to determine that measurements for all frequencies included in the frequency list have been performed in case an index (i) of a frequency for which channel measurement is performed is equal to the maximum number of frequencies ($i_{MAX}$) included in the frequency list. According to an embodiment, the processor 400 may be configured to determine that a frequency for which channel measurement has not been performed exists among frequencies included in the frequency list in case the index (i) of the frequency for which channel measurement is performed is less than the maximum number of frequencies ($i_{MAX}$) included in the frequency list.

According to an embodiment, in case the electronic device (e.g., the processor 120 or 400) has determined that channel measurements for all frequencies included in the frequency list have been performed (e.g., 'Yes' in operation 703), an embodiment for adaptively performing the channel measurement may be ended.

According to an embodiment, in case the electronic device (e.g., the processor 120 or 400) has determined that a frequency for which channel measurement has not been performed exists among the frequencies included in the frequency list (e.g., 'No' in operation 703), the electronic device may be configured to identify whether all preferred frequencies included in the frequency list have been measured, in operation 705. For example, the preferred frequency is included in the frequency list and may include at least one frequency, which is selected based on a frequency combination of a CA function and/or a DC function preferred by the electronic device 101, among at least one frequency identified in SIB 11.

According to an embodiment, in case the electronic device (e.g., the processor 120 or 400) has determined that all preferred frequencies included in the frequency list have been measured (e.g., 'Yes' in operation 705), the electronic device may be configured to identify whether the measurement result of the preferred frequencies satisfies a reference level, in operation 707. As an example, the reference level may be included in "qualityThreshold" and/or "qualityThresholdEUTRA" of the "measIdleConfig" information element (IE) of a message related to RRC connection release illustrated in Table 9 (e.g., 3GPP TS 38.331 standard).

TABLE 9

```
MeasIdleCarrierNR-r16 ::=              SEQUENCE {
  carrierFreq-r16                         ARFCN-ValueNR,
  ssbSubcarrierSpacing-r16              SubcarrierSpacing,
  frequencyBandList                    MultiFrequencyBandListNR      OPTIONAL,  -- Need R
  measCellListNR-r16                   CellListNR-r16                OPTIONAL,  -- Need R
  reportQuantities-r16                 ENUMERATED {rsrp, rsrq, both},
  qualityThreshold-r16                    SEQUENCE {
    idleRSRP-Threshold-NR-r16                  RSRP-Range              OPTIONAL,  -- Need R
    idleRSRQ-Threshold-NR-r16                  RSRQ-Range              OPTIONAL   -- Need R
  }
OPTIONAL,  -- Need R
  ssb-MeasConfig-r16                          SEQUENCE {
    nrofSS-BlocksToAverage-r16                         INTEGER (2..maxNrofSS-BlocksToAverage)
OPTIONAL,  -- Need S
    absThreshSS-BlocksConsolidation-r16              ThresholdNR       OPTIONAL,  -- Need S
    smtc-r16                                         SSB-MTC           OPTIONAL,  -- Need S
    ssb-ToMeasure-r16                                SSB-ToMeasure     OPTIONAL,  -- Need S
    deriveSSB-IndexFromCell-r16                    BOOLEAN,
    ss-RSSI-Measurement-r16                       SS-RSSI-Measurement  OPTIONAL   -- Need S
  }
OPTIONAL,  -- Need S
  beamMeasConfigIdle-r16                   BeamMeasConfigIdle-NR-r16   OPTIONAL,  -- Need R
  ...
}
MeasIdleCarrierEUTRA-r16 ::=             SEQUENCE {
  carrierFreqEUTRA-r16                        ARFCN-ValueEUTRA,
  allowedMeasBandwidth-r16                    EUTRA-AllowedMeasBandwidth,
  measCellListEUTRA-r16                       CellListEUTRA-r16      OPTIONAL,  -- Need R
  reportQuantitiesEUTRA-r16                   ENUMERATED {rsrp, rsrq, both},
  qualityThresholdEUTRA-r16                   SEQUENCE {
    idleRSRP-Threshold-EUTRA-r16                RSRP-RangeEUTRA        OPTIONAL,  -- Need R
    idleRSRQ-Threshold-EUTRA-r16              RSRQ-RangeEUTRA-r16      OPTIONAL   -- Need R
  }                                                                    OPTIONAL,  -- Need S
  ...
}
```

According to an embodiment, in case a preferred frequency for which measurement has not been performed exists among preferred frequencies included in the frequency list (e.g., 'No' in operation 705) or the measurement result of the preferred frequencies does not satisfy the reference level (e.g., 'No' in operation 707), the electronic device (e.g., the processor 120 or 400) may be configured to update an index (i) indicating a priority of a frequency included in the frequency list to an index (e.g., I++) in operation 711.

According to an embodiment, in case the measurement result of the preferred frequencies satisfies the reference level (e.g., 'Yes' in operation 707), the electronic device (e.g., the processor 120 or 400) may be configured to limit channel measurement in an RRC idle state or RRC inactive state, in operation 709. According to an embodiment, the processor 400 may be configured to determine that the CA function or the DC function may be provided based on the preferred frequencies in case the result of channel measurement for the preferred frequencies included in the frequency list satisfies the reference level. The processor 400 may determine that measurement of at least one remaining frequency except for the preferred frequencies included in the frequency list is unnecessary, and thus may be configured to control the communication circuit 410 not to measure the remaining frequencies.

According to an embodiment, the electronic device 101 (e.g., the processor 120 or 400) may be configured to limit the measurement of at least one remaining frequency except for the preferred frequencies included in the frequency list, so as to reduce power consumption of the electronic device 101 according to the channel measurement.

According to an embodiment, in case a running time of a timer for determining a time duration for performing the channel measurement in the RRC idle state or RRC inactive state expires, the electronic device 101 (e.g., the processor 120 or 400) may be configured to end (or limit) channel measurement in the RRC idle state or RRC inactive state.

Figure 8:
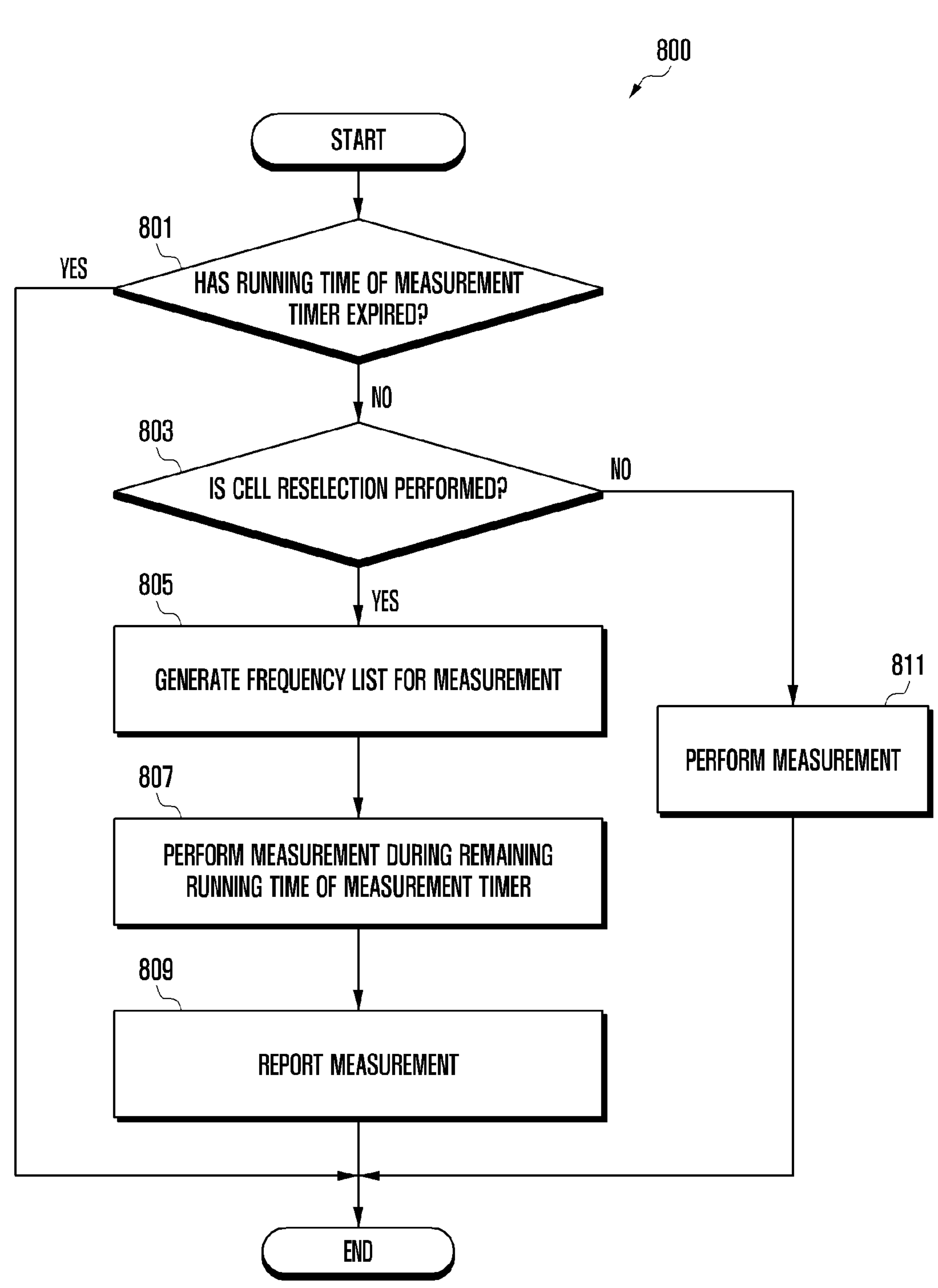
FIG. 8 is a flowchart illustrating example performance of channel measurement based on a timer related to channel measurement in an electronic device according to various embodiments.

FIG. 8 is a flowchart 800 illustrating example performance of channel measurement based on a timer related to channel measurement in an electronic device according to various embodiments. In the following example embodiment, respective operations may be performed sequentially, but are not necessarily performed sequentially. For example, the sequence of respective operations may be changed, or at least two operations may be performed in parallel. As an example, the electronic device may correspond to the electronic device 101 of FIG. 1, FIG. 2, FIG. 3 or FIG. 4.

According to an embodiment referring to FIG. 8, in operation 801, the electronic device (e.g., the processor 120 of FIG. 1 or the processor 400 of FIG. 4) may be configured to identify whether a running time of a timer for determining a time duration for performing channel measurement in an RRC idle state or RRC inactive state has expired. For example, the timer may be started (e.g., reset) based on a determination that channel measurement is performed in an RRC idle state or RRC inactive state.

According to an embodiment, in case the running time of the timer has not expired (e.g., 'No' in operation 801), the electronic device (e.g., the processor 120 or 400) may be configured to identify whether cell reselection is performed in operation 803.

According to an embodiment, in case cell reselection is not performed (e.g., 'No' in operation 803), the electronic device (e.g., the processor 120 or 400) may be configured to perform measurement sequentially in an RRC idle state or RRC inactive state based on the priority of at least one frequency included in a frequency list in operation 811. According to an embodiment, the processor 400 may be configured to control the communication circuit 410 to sequentially perform measurement based on a priority of at least one frequency included in the frequency list while the timer is running in the RRC idle state or RRC inactive state. For example, the frequency list may be generated based on the priority of a serving frequency of the electronic device 101 and a channel state of a network, like operation 505 of FIG. 5 or operation 601 to operation 619 of FIG. 6.

According to an embodiment, in case cell reselection is performed (e.g., 'Yes' in operation 803), the electronic device (e.g., the processor 120 or 400) may be configured to generate (or update) a frequency list for channel measurement based on the cell reselection in operation 805. According to an embodiment, the processor 400 may stop running of the timer based on the cell reselection. According to an embodiment, the processor 400 may be configured to newly generate a frequency list for channel measurement (or estimation) in an RRC idle state or RRC inactive state based on the priority of a cell accessed through cell reselection and channel state information of a network. As an example, as in operation 505 of FIG. 5 or operations 601 to 619 of FIG. 6, the frequency list may be generated based on a priority of an operating frequency (e.g., updated serving frequency) of the cell, to which the electronic device 101 is connected through cell reselection, and the channel state between the electronic device and the network. For example, a cell accessed through cell reselection may include a cell on which the electronic device 101 camps through cell reselection.

According to an embodiment, in operation 807, the electronic device (e.g., the processor 120 or 400) may be configured to perform channel measurement based on a frequency list related to a cell accessed through cell reselection during the remaining running time of the timer. According to an embodiment, the processor 400 may be configured to control the communication circuit 410 to perform measurement sequentially based on the priority of at least one frequency included in the newly generated frequency list during the remaining time of the timer in an RRC idle state or RRC inactive state with a cell accessed through cell reselection. For example, the remaining time of the timer may include the remaining running time except for a running time up to a time point, at which the running of the timer is stopped based on cell reselection, from the total running time of the timer.

According to an embodiment, in operation 809, the electronic device (e.g., the processor 120 or 400) may be configured to transmit (or report) a result of channel measurement performed in an RRC idle state or RRC inactive state to a network (or base station) based on the transition to an RRC connected state. For example, the channel measurement result may include a result of channel measurement performed after cell reselection.

According to an example embodiment, a method for operating an electronic device may include: obtaining information related to measurement from a message related to release of a radio resource control (RRC) connection of the electronic device to a network, identifying frequencies for measurement while the electronic device is in an RRC idle or RRC inactive state with the network, generating a frequency list including at least one of the frequencies for measurement based on a priority of a frequency used for access between the electronic device and the network and a channel state between the electronic device and the network, sequentially performing measurement based on a priority of at least one frequency included in the frequency list while the electronic device is in an RRC idle state or RRC inactive state with the network, and transmitting a result of the measurement to the network based on transition to an RRC connected state.

According to an example embodiment, the identifying of the frequencies for measurement may include identifying, in the system information block (SIB) 4 and SIB 11 received from the network, frequencies for measurement in the RRC idle state (RRC idle) or the RRC inactive state (RRC inactive).

According to an example embodiment, the generating of the frequency list may include generating the frequency list based on the at least one frequency included in the SIB 11, based on the priority of the frequency used for access between the electronic device and the network being higher than the priority of at least one frequency included in the system information block (SIB) 4, a signal strength with the network exceeding a first reference value configured by the network, and the signal quality with the network exceeding a second reference value configured by the network.

According to an example embodiment, the generating of the frequency list may include generating the frequency list based on the at least one frequency included in the SIB 4, based on the priority of the frequency used for access between the electronic device and the network being higher than the priority of at least one frequency included in the SIB 4, a signal strength with the network having a value equal to or less than a first reference value configured by the network or a signal quality with the network having a value equal to or less than a second reference value configured by the network, and the signal strength with the network having a value equal to or less than a third reference value configured by the electronic device.

According to an example embodiment, the generating of the frequency list may include: generating the frequency list based on the at least one frequency included in the SIB 4 and the SIB 11, based on the priority of the frequency used for access between the electronic device and the network being higher than the priority of at least one frequency included in the SIB 4, a signal strength with the network having a value equal to or less than a first reference value configured by the network or a signal quality with the network having a value equal to or less than a second reference value configured by the network, and the signal strength with the network having a value exceeding a third reference value configured by the electronic device, wherein, in the frequency list, the priority of the at least one frequency included in the SIB 4 is configured to be higher than the priority of the at least one frequency included in the SIB 11.

According to an example embodiment, the generating of the frequency list may include: generating the frequency list based on at least a part of the at least one frequency included in SIB 11 and the at least one frequency included in SIB 4, based on at least one frequency having a priority equal to or higher than that of a frequency used for access between the electronic device and the network, among at least one frequency included in the SIB 4 existing, a signal strength with the network exceeding a first reference value configured by the network, a signal quality with the network exceeding a second reference value configured by the network, and the signal strength with the network exceeding a fourth reference value configured by the electronic device, wherein, in the frequency list, the priority of the at least one frequency included in the SIB 11 is configured to be higher than that of the at least one frequency included in the SIB 4.

According to an example embodiment, the generating of the frequency list may include: generating the frequency list based on at least a part of the at least one frequency included in SIB 11 and the at least one frequency included in SIB 4, based on at least one frequency having a priority equal to or higher than a frequency used for access between the electronic device and the network, among at least one frequency included in the SIB 4 existing, a signal strength with the network exceeding a first reference value configured by the network, a signal quality with the network exceeding a second reference value configured by the network, and the signal strength with the network having a value equal to or less than a fourth reference value configured by the electronic device, wherein, in the frequency list, the priority of the at least one frequency included in the SIB 4 is configured to be higher than that of the at least one frequency included in the SIB 11.

According to an example embodiment, the generating of the frequency list may include: generating the frequency list based on the at least one frequency included in SIB 4, based on at least one frequency having a priority equal to or higher than that of a frequency used for access between the electronic device and the network, among at least one frequency included in the SIB 4 existing, a signal strength with the network having a value equal to or less than a first reference value configured by the network or a signal quality with the network has a value equal to or less than a second reference value configured by the network, and the signal strength with the network having a value equal to or less than a third reference value configured by the electronic device.

According to an example embodiment, the generating of the frequency list may include: generating the frequency list based on at least one frequency included in SIB 4 and SIB 11, based on at least one frequency having a priority equal to or higher than that of a frequency used for access between the electronic device and the network, among at least one frequency included in the SIB 4 existing, a signal strength with the network having a value equal to or less than a first reference value configured by the network or a signal quality with the network having a value equal to or less than a second reference value configured by the network, and the signal strength with the network having a value exceeding a third reference value configured by the electronic device, wherein, in the frequency list, the priority of the at least one frequency included in the SIB 4 is configured to be higher than that of the at least one frequency included in the SIB 11.

According to an example embodiment, the generating of the frequency list may include: excluding a part of at least one frequency included in the SIB 11 from the frequency list based on the number of frequencies included in the frequency list exceeding the maximum number of frequencies configured for the measurement.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a communication circuit;

at least one processor operatively connected to the communication circuit; and memory storing instructions, wherein the instructions, when executed by the at least one processor, cause the electronic device to:

receive a message related to release of a radio resource control (RRC) connection of the electronic device to a network;

detect that the received message includes information related to measurement and identify first frequency information related to cell reselection included in a first system information block (SIB) and second frequency information related to a carrier aggregation (CA) function and/or a dual connectivity (DC) function included in a second SIB received from the network while the electronic device is in an RRC idle or an RRC inactive state with the network;

generate at least a part of a frequency list from at least one of the first frequency information or the second frequency information based on a priority of a frequency used for access between the electronic device and the network and a channel state between the electronic device and the network;

perform measurement on at least one frequency included in the generated frequency list while the electronic device is in an RRC idle state or an RRC inactive state with the network; and detect that an RRC state is transitioned from the RRC idle state or the RRC inactive state to an RRC connected state and transmit, via the communication circuit, a result of the measurement to the network.

2. The electronic device of claim 1, wherein the instructions, when executed by the at least one processor, cause the electronic device to, based on the priority of the frequency used for access between the electronic device and the network being higher than the priority of at least one frequency included in the first frequency information, a signal strength with the network exceeding a first reference value configured by the network, and the signal quality with the network exceeding a second reference value configured by the network: generate the frequency list using the at least one frequency included in the second frequency information.

3. The electronic device of claim 1, wherein the instructions, when executed by the at least one processor, cause the electronic device to, based on the priority of the frequency used for access between the electronic device and the network being higher than the priority of at least one frequency included in the first frequency information, a signal strength with the network having a value equal to or less than a first reference value configured by the network or a signal quality with the network having a value equal to or less than a second reference value configured by the network, and the signal strength with the network having a value equal to or less than a third reference value configured by the electronic device: generate the frequency list using the at least one frequency included in the first frequency information.

4. The electronic device of claim 1, wherein the instructions, when executed by the at least one processor, cause the electronic device to, based on the priority of the frequency used for access between the electronic device and the network being higher than the priority of at least one frequency included in the first frequency information, a signal strength with the network having a value equal to or less than a first reference value configured by the network or a signal quality with the network having a value equal to or less than a second reference value configured by the network, and the signal strength with the network having a value exceeding a third reference value configured by the electronic device: generate the frequency list using the at least one frequency included in the first frequency information and the second frequency information, and wherein, in the frequency list, the priority of the at least one frequency included in the first frequency information is configured to be higher than the priority of the at least one frequency included in the second frequency information.

5. The electronic device of claim 1, wherein the instructions, when executed by the at least one processor, cause the electronic device to, based on at least one frequency having a priority equal to or higher than a frequency used for access between the electronic device and the network among at least one frequency included in the first frequency information existing, a signal strength with the network exceeding a first reference value configured by the network, a signal quality with the network exceeding a second reference value configured by the network, and the signal strength with the network exceeding a fourth reference value configured by the electronic device: generate the frequency list using at least a part of the at least one frequency included in the second frequency information and the at least one frequency included in the first frequency information, and wherein, in the frequency list, the priority of the at least one frequency included in the second frequency information is configured to be higher than the priority of the at least one frequency included in the first frequency information.

6. The electronic device of claim 1, wherein the instructions, when executed by the at least one processor, cause the electronic device to, based on at least one frequency having a higher priority than a frequency used for access between the electronic device and the network among at least one frequency included in the first frequency information existing, a signal strength with the network exceeding a first reference value configured by the network, a signal quality with the network exceeding a second reference value configured by the network, and the signal strength with the network having a value equal to or less than a fourth reference value configured by the electronic device: generate the frequency list using at least a part of the at least one frequency included in the second frequency information and the at least one frequency included in the first frequency information, and wherein, in the frequency list, the priority of the at least one frequency included in the first frequency information is configured to be higher than that of the at least one frequency included in the second frequency information.

7. The electronic device of claim 1, wherein the instructions, when executed by the at least one processor, cause the electronic device to, based on at least one frequency having a higher priority than a frequency used for access between the electronic device and the network among at least one frequency included in the first frequency information existing, a signal strength with the network having a value equal to or less than a first reference value configured by the network or a signal quality with the network having a value equal to or less than a second reference value configured by the network, and the signal strength with the network having a value equal to or less than a third reference value configured by the electronic device: generate the frequency list using the at least one frequency included in the first frequency information.

8. The electronic device of claim 1, wherein the instructions, when executed by the at least one processor, cause the electronic device to, based on at least one frequency having a higher priority than a frequency used for access between the electronic device and the network among at least one frequency included in the first frequency information existing, a signal strength with the network having a value equal to or less than a first reference value configured by the network or a signal quality with the network having a value equal to or less than a second reference value configured by the network, and the signal strength with the network having a value exceeding a third reference value configured by the electronic device: generate the frequency list using the at least one frequency included in the first frequency information and the second frequency information, and wherein, in the frequency list, the priority of the at least one frequency included in the first frequency information is configured to be higher than the priority of the at least one frequency included in the second frequency information.

9. The electronic device of claim 1, wherein the instructions, when executed by the at least one processor, cause the electronic device to, based on a number of frequencies included in the frequency list exceeding a maximum number of frequencies configured for the measurement, exclude a part of at least one frequency included in the second frequency information from the frequency list.

10. A method of operating an electronic device, the method comprising:

receiving measurement from a message related to release of a radio resource control (RRC) connection of the electronic device to a network;

detecting that the received message includes information related to measurement and identifying first frequency information related to cell reselection included in a first system information block (SIB) and second frequency information related to a carrier aggregation (CA) function and/or a dual connectivity (DC) function included in a second SIB received from the network while the electronic device is in an RRC idle or an RRC inactive state with the network;

generating at least a part of a frequency list from at least one of the first frequency information or the second frequency information based on a priority of a frequency used for access between the electronic device and the network and a channel state between the electronic device and the network;

performing measurement on at least one frequency included in the generated frequency list while the electronic device is in an RRC idle state or an RRC inactive state with the network; and detecting that an RRC state is transitioned from the RRC idle state or the RRC inactive state to an RRC connected state and transmitting a result of the measurement to the network.

11. The method of claim 10, wherein the generating of the frequency list comprises: generating the frequency list using the at least one frequency included in the second frequency information, based on the priority of the frequency used for access between the electronic device and the network being higher than the priority of at least one frequency included in the first frequency information, a signal strength with the network exceeding a first reference value configured by the network, and the signal quality with the network exceeding a second reference value configured by the network.

12. The method of claim 10, wherein the generating of the frequency list comprises: generating the frequency list using the at least one frequency included in the first frequency information, based on the priority of the frequency used for access between the electronic device and the network being higher than the priority of at least one frequency included in the first frequency information, a signal strength with the network having a value equal to or less than a first reference value configured by the network or a signal quality with the network having a value equal to or less than a second reference value configured by the network, and the signal strength with the network having a value equal to or less than a third reference value configured by the electronic device; or based on at least one frequency having a higher priority than a frequency used for access between the electronic device and the network among at least one frequency included in the first frequency information existing, a signal strength with the network having a value equal to or less than a first reference value configured by the network or a signal quality with the network having a value equal to or less than a second reference value configured by the network, and the signal strength with the network having a value equal to or less than a third reference value configured by the electronic device.

13. The method of claim 10, wherein the generating of the frequency list comprises: generating the frequency list using the at least one frequency included in the first frequency information and the second frequency information, based on the priority of the frequency used for access between the electronic device and the network being higher than the priority of at least one frequency included in the first frequency information, a signal strength with the network having a value equal to or less than a first reference value configured by the network or a signal quality with the network having a value equal to or less than a second reference value configured by the network, and the signal strength with the network having a value exceeding a third reference value configured by the electronic device; or based on at least one frequency having a higher priority than that of a frequency used for access between the electronic device and the network among at least one frequency included in the first frequency information existing, a signal strength with the network having a value equal to or less than a first reference value configured by the network or a signal quality with the network having a value equal to or less than a second reference value configured by the network, and the signal strength with the network having a value exceeding a third reference value configured by the electronic device, and wherein, in the frequency list, the priority of the at least one frequency included in the first frequency information is configured to be higher than the priority of the at least one frequency included in the second frequency information.

14. The method of claim 10, wherein the generating of the frequency list comprises: generating the frequency list using at least a part of the at least one frequency included in the second frequency information1 and the at least one frequency included in the first frequency information, based on at least one frequency having a priority equal to or higher than a frequency used for access between the electronic device and the network among at least one frequency included in the first frequency information existing, a signal strength with the network exceeding a first reference value configured by the network, a signal quality with the network exceeding a second reference value configured by the network, and the signal strength with the network exceeding a fourth reference value configured by the electronic device, and wherein, in the frequency list, the priority of the at least one frequency included in the second frequency information is configured to be higher than that of the at least one frequency included in the first frequency information.

15. The method of claim 10, wherein the generating of the frequency list comprises: generating the frequency list using at least a part of the at least one frequency included in the second frequency information and the at least one frequency included in the first frequency information, based on at least one frequency having a higher priority than a frequency used for access between the electronic device and the network among at least one frequency included in the first frequency information existing, a signal strength with the network exceeding a first reference value configured by the network, a signal quality with the network exceeding a second reference value configured by the network, and=the signal strength with the network having a value equal to or less than a fourth reference value configured by the electronic device, and wherein, in the frequency list, the priority of the at least one frequency included in the first frequency information is configured to be higher than that of the at least one frequency included in the second frequency information.

16. The method of claim 10, wherein the generating of the frequency list comprises: generating the frequency list using the at least one frequency included in the first frequency information, based on at least one frequency having a priority equal to or higher than that of a frequency used for access between the electronic device and the network, among at least one frequency included in the first frequency information existing, a signal strength with the network having a value equal to or less than a first reference value configured by the network or a signal quality with the network has a value equal to or less than a second reference value configured by the network, and the signal strength with the network having a value equal to or less than a third reference value configured by the electronic device.

17. The method of claim 10, wherein the generating of the frequency list comprises: generating the frequency list using at least one frequency included in the first frequency information and the second frequency information, based on at least one frequency having a priority equal to or higher than that of a frequency used for access between the electronic device and the network, among at least one frequency included in the first frequency information existing, a signal strength with the network having a value equal to or less than a first reference value configured by the network or a signal quality with the network having a value equal to or less than a second reference value configured by the network, and the signal strength with the network having a value exceeding a third reference value configured by the electronic device, wherein, in the frequency list, the priority of the at least one frequency included in the first frequency information is configured to be higher than that of the at least one frequency included in the second frequency information.

18. The method of claim 10, wherein the generating of the frequency list comprises: excluding a part of at least one frequency included in the second frequency information from the frequency list based on the number of frequencies included in the frequency list exceeding the maximum number of frequencies configured for the measurement.

* * * * *